United States Patent [19]

Grone

[11] Patent Number: 4,700,293

[45] Date of Patent: Oct. 13, 1987

[54] MAINTENANCE PORT SYSTEM INCORPORATING SOFTWARE DEVELOPMENT PACKAGE

[75] Inventor: Donald J. Grone, Reisterstown, Md.

[73] Assignee: The United States of America as represented by the Secretary of the Air Force, Washington, D.C.

[21] Appl. No.: 733,991

[22] Filed: May 14, 1985

[51] Int. Cl.⁴ .............................................. G06F 11/00
[52] U.S. Cl. ................................. 364/200; 364/487; 371/20; 324/73 AT
[58] Field of Search ... 364/200 MS File, 900 MS File, 364/481, 487; 371/16, 20; 324/73 R, 73 AT

[56] References Cited

U.S. PATENT DOCUMENTS

| | | | |
|---|---|---|---|
| 3,854,125 | 12/1974 | Ehling et al. | 340/172.5 |
| 4,097,797 | 6/1978 | Finet | 324/73 R |
| 4,108,358 | 8/1978 | Niemaszyk | 235/322 |
| 4,168,527 | 9/1979 | Winkler | 364/580 |
| 4,475,195 | 10/1984 | Carey . | |
| 4,574,354 | 3/1986 | Mihalik et al. | 364/487 |
| 4,608,652 | 8/1986 | Yokokawa et al. | 364/481 |

OTHER PUBLICATIONS

Farly, *When Logic Analyzers Meet Development Systems*, 9-13-79, Electronics, p. 141.

Primary Examiner—Raulfe B. Zache
Assistant Examiner—Michael J. Ure
Attorney, Agent, or Firm—Bernard E. Franz; Donald J. Singer

[57] ABSTRACT

The maintenance port system includes a maintenance unit, user prom, an available CRT terminal, and a prom software development package. This system accepts parametric definitions for an automatic panel as defined by the designer, and formats the panel data for display and modification on a CRT (cathode ray tube) terminal. Because the system controls the formats, standard display and modification procedures are then used for transmitting and receiving parameters and are the same from panel to panel.

4 Claims, 34 Drawing Figures

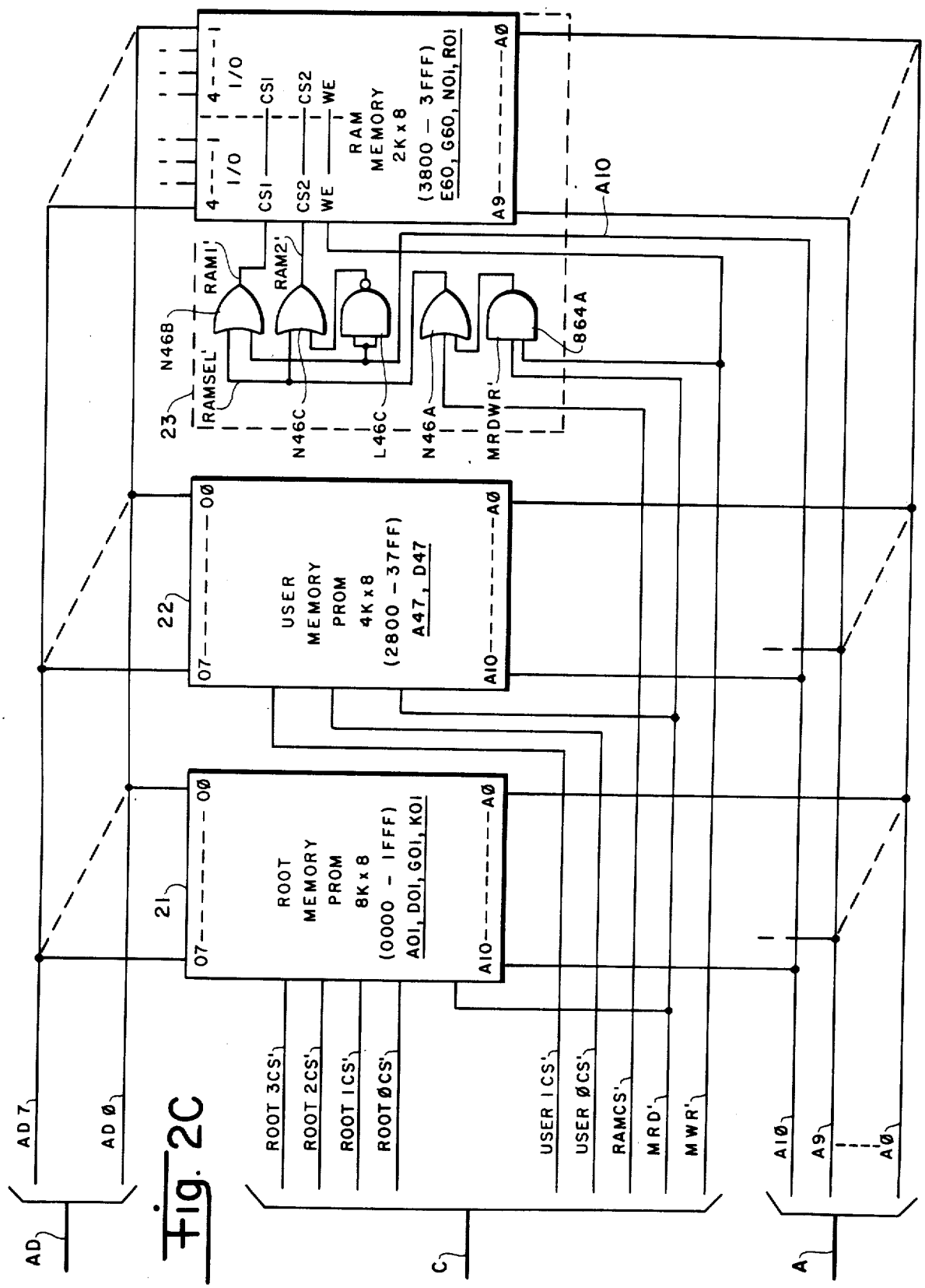

```
                    computer -> automatic panel (write)

busdata (0-15) ─────X‾PARAMETER SELECT‾X‾PARAMETER DATA‾X───── parameter
select strobe  ──────────────/‾‾‾\──────────────────────────── output
data strobe    ────────────────────────────/‾‾‾\────────────── automatic panel -> computer (read)

busdata (0-15) ─────X‾PARAMETER SELECT‾X‾PARAMETER DATA‾X───── parameter
select strobe  ──────────────/‾‾‾\──────────────────────────── input
data strobe    ────────────────────────────/‾‾‾‾‾‾‾‾‾‾\──────
```

Fig. 3

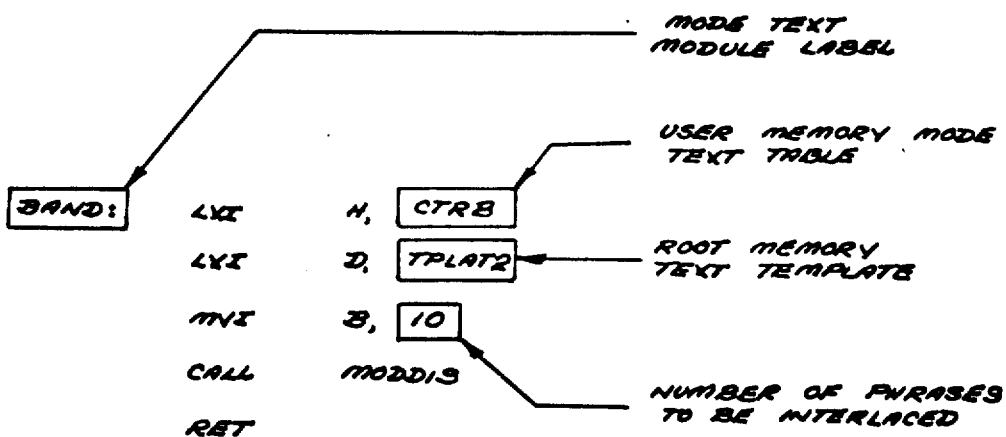

TYPICAL MODE TEXT MODULE

Fig. 5

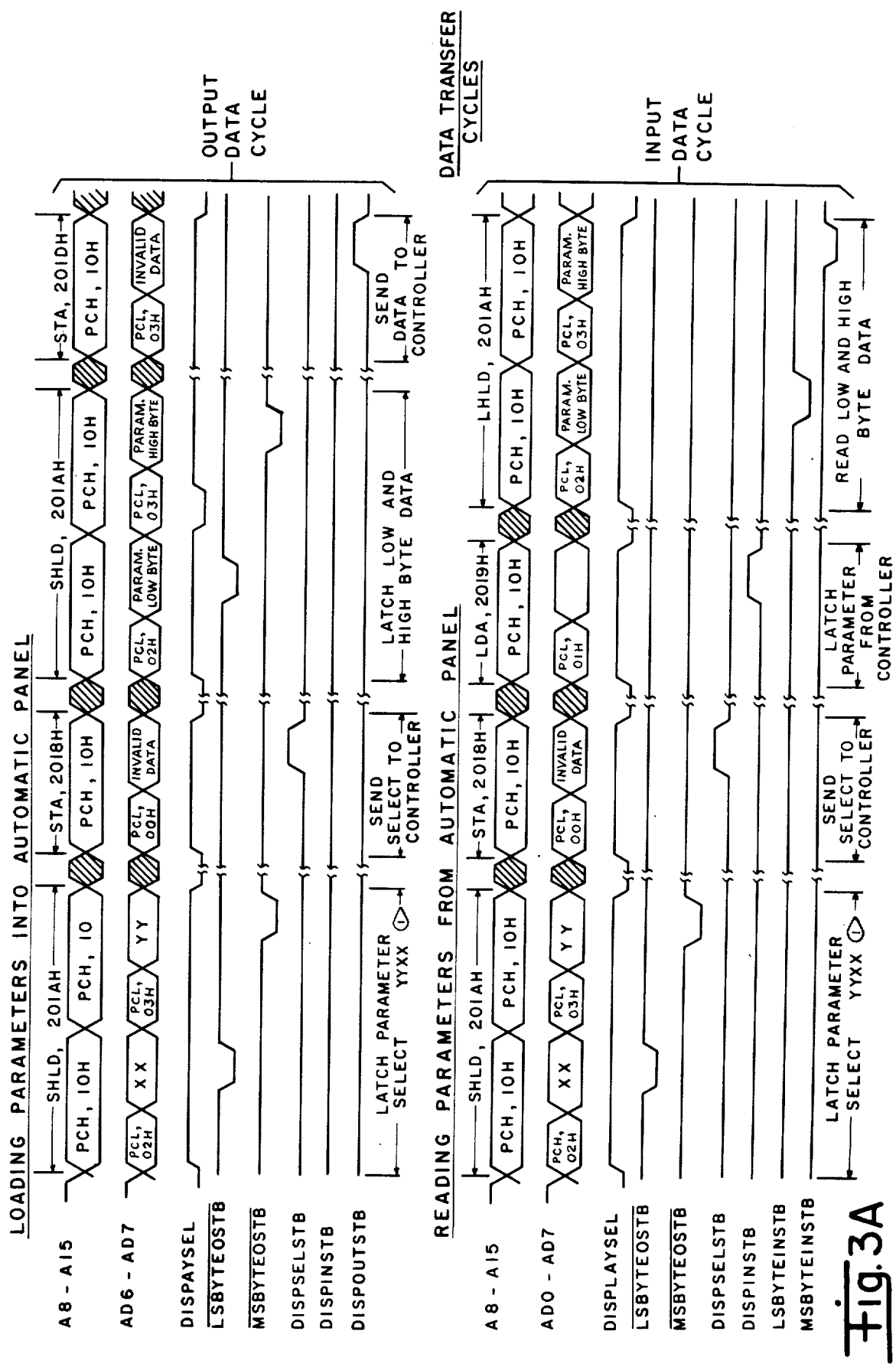

USER MEMORY

```
CLUTTER ATTENUATION MODE
BIT NO.
MSB
  7  NOT USED
  6  NOT USED
  5  NOT USED
  4  FULL ATTENUATION SELECT   1=FULL ATTENUATION, 0=NORMAL ATTENUATION
  3  ELEVATION ATTENUATION ENABLE   1=ENABLED, 0=DISBALED
  2  ATTENUATION RANGE DEPENDENCE SELECT   1=1/R**4, 0=1/R**2
  1  ATTENUATION SELECT   1=BASED ON RANGE, 0=FIXED
  0  ATTENUATION CLEAR   1=NO ATTENUATION, 0=ATTENUATION
LSB
```

TYPICAL REGISTER HEADER DISPLAY

Fig. 6

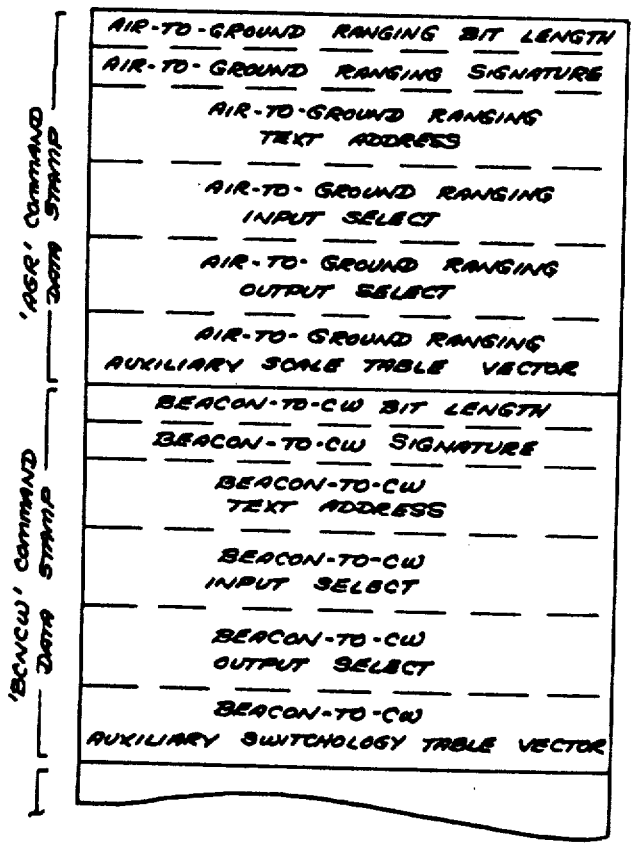

PARAMETRIC
DEFINITION
TABLE

DATA
STRUCTURE

Fig. 7

PARAMETRIC DEFINITION TABLE DATA STAMP

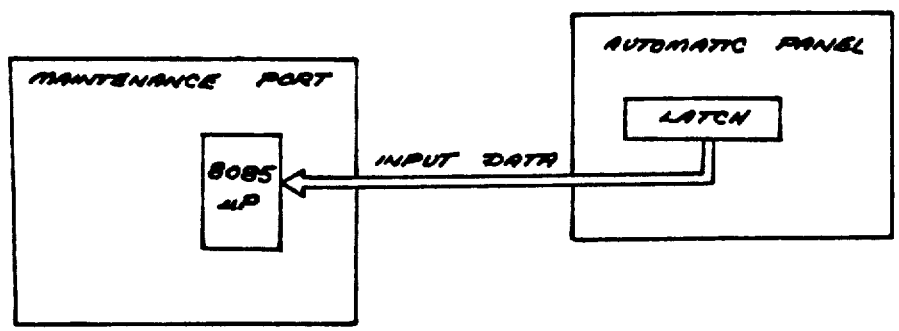
INPUT PARAMETERS
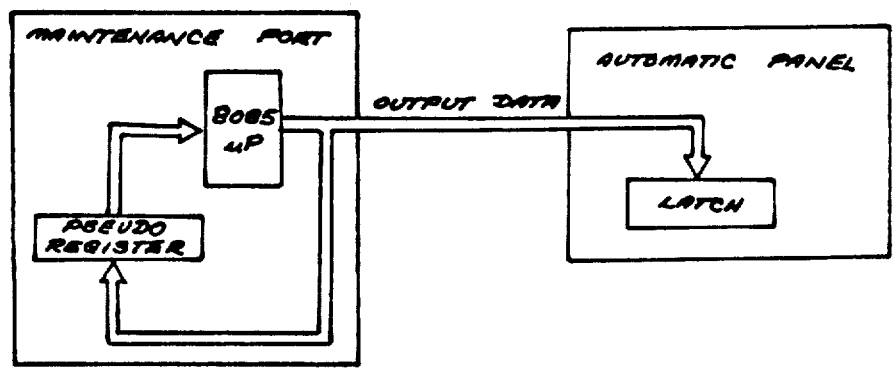
OUTPUT PARAMETERS
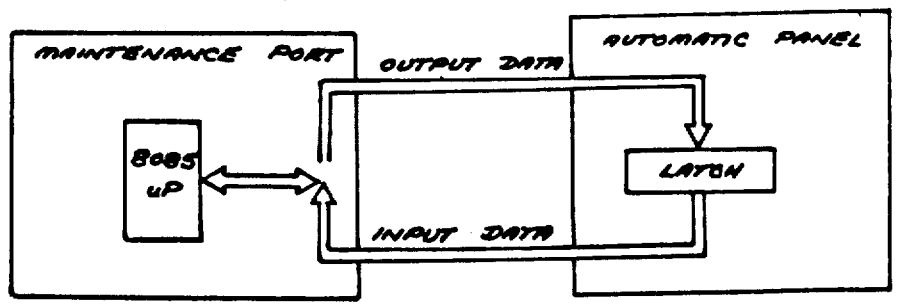
INPUT / OUTPUT PARAMETERS
Fig. 9

REGISTER SCALE FACTOR (BYTES 1-4)
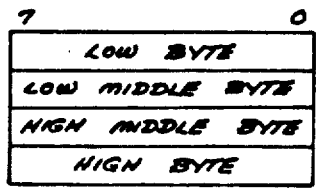
DECIMAL PLACEMENT (BYTE 5)
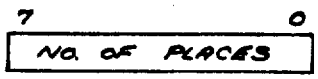
REGISTER SCALE TEXT VECTOR (BYTES 6,7)
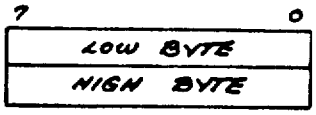
PARAMETER DATA TYPE (BYTE 8)
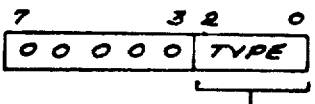
001 SIGN MAGNITUDE
010 UNSIGNED
100 TWOS COMPLEMENT
SCALE TABLE DATA STAMP
Fig. 10
SYNC DATA MASK (BYTES 1,2)
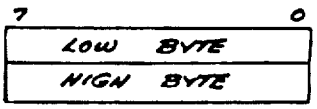
SYNC DATA ON DEFINITION (BYTES 3,4)
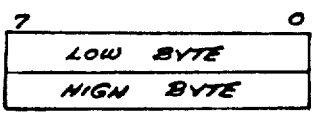
SYNC DATA OFF DEFINITION (BYTES 5,6)
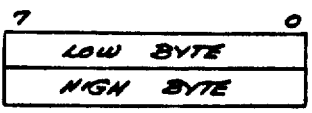
SYNC TABLE DATA STAMP
Fig. 12

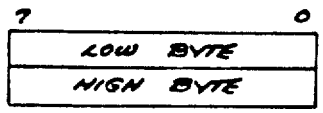
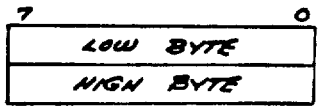
SWITCHOLOGY TABLE DATA STAMP
Fig. 11
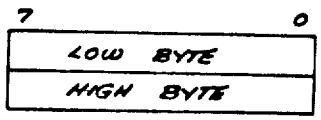
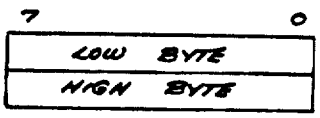
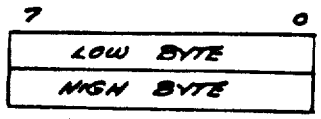
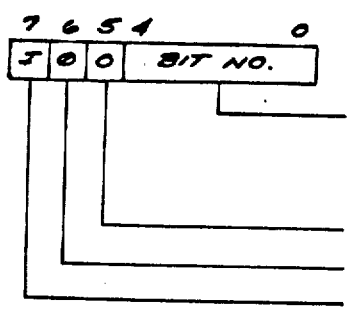
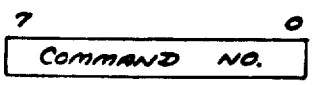
Fig. 13
ADDRESS DEFINITION TABLE
DATA STAMP

THE MODE 0 LINK
BLOCK DIAGRAM

MODE 0 OPERATIONS

MODE I OPERATION
REGISTER DISPLAY
GENERATION

MODE I OPERATION
REGISTER DISPLAY
GENERATION

```
INPUT SELECT = NONE [2]        OUTPUT SELECT = 0031 [3]
AGR PULSE WIDTH = 12.3 [4]     USEC, 0.1 USEC/BIT [7]
[1]               XX.X [6]       (SCALE) [5]
```

Legend:

[1] Register's Name
[2] Input Select Code
[3] Output Select Code
[4] Register Data Value
[5] Data Format Field
[6] Data Change Field
[7] Scale Text Message

Fig. 19

NON-MODE REGISTER DISPLAY
EXAMPLE

```
TARGET MODE DEFINITION
BIT NO.
MSB
 15   NOT USED
 14   NOT USED
 13   TARGET DOPPLER SELECT       1=FIXED , 0=BASED ON VELOCITY
 12   AIR-TO-GROUND RANGING SELECT 1 = ON , 0 = OFF
 11   TARGET CHANNEL SELF TEST ENABLE  1 = ENABLED , 0 = DISABLED
 10   MULTIPLE TARGET MODE        1 = ENABLED , 0=DISABLED
  9   TARGET CW/PULSED SELECT     1=CW , 0=PULSED
  8   TARGET OUTPUT ENABLE        1=ENABLED , 0=DISABLED
  7   TARGET/BEACON SELECT        1=TARGET , 0=BEACON
  6   NOT USED
  5   TARGET ACCELERATION INHIBIT 1=INHIBITED , 0=ENABLED
  4   TARGET VELOCITY INHIBIT     1=INHIBITED , 0=ENABLED
  3   ***************
  2   *  NUMBER  OF *
  1   *   TARGETS   *
  0   ***************
LSB
```

Fig. 20

MODE REGISTER HEADER DISPLAY
EXAMPLE.

```
TARGET ATTENUATION PROM [1]

INPUT SELECT = 8012 [2]        OUTPUT SELECT = NONE [3]
ADDRESS SELECT = 0000 [4]      ADDRESS RANGE = 0000 TO 07FF [5]

*
```

Legend:

[1] Memory Name
[2] Input Select Code
[3] Output Select Code
[4] Address Select Code
[5] Address Range

Fig. 24

MEMORY MODE DISPLAY
EXAMPLE

REGISTER HEADER GENERATION

MODE I OPERATION
SETTING A SWITCH

MODE 1 OPERATION
GENERATING A SYNC

MODE 2 OPERATION

MODE 3 OPERATION

MAINTENANCE PORT SYSTEM INCORPORATING SOFTWARE DEVELOPMENT PACKAGE

RIGHTS OF THE GOVERNMENT

The invention described herein may be manufactured and used by or for the Government of the United States for all governmental purposes without the payment of any royalty.

BACKGROUND OF THE INVENTION

This invention relates to a maintenance port system that facilitates the testing and troubleshooting of any computer-controlled panel from any automatic test set without requiring the test set computer or application software.

An automatic test set built to exercise a system (for example, an aircraft radar system) or a system component usually has one or more automatic panels that interface to the test set computer across a well-defined computer bus. During test, the test set computer controls or monitors the unit under test by transferring parameters to and from the appropriate panels at the appropriate time as dictated by application software.

Hardware engineers are required to obtain a working knowledge of application software and test set hardware, in addition to panel hardware, in order to debug their automatic panels. This requirement produces inherent delays in the debug and repair of these panels throughout the entire life of the test set.

For newly designed automatic test sets, delivery dates are delayed because of improper marriage between virgin panel hardware and virgin application software. In many instances, the hardware engineer sits idly by while the software engineer searches for the "bug" in this program. Conversely, the software engineer is idle while the hardware engineer repairs his panel. This serial effort —or "handshake"—between software and hardware has a tendency to string out test time.

Repair of automatic panels is a nightmare for technicians and follow engineers. Generally, a panel failure not readily detectable by the test set technician or follow engineer dictates that he either consult a resident expert on the panel, or become familiar with both the test set hardware and application software. Resident "experts", however, are quite forgetful and test set hardware/software familiarization can take several weeks.

The previous solution has been to check out any automatic panel on the test set using self test routines that, when executed would send test parameters to the panel and read back results. More sophisticated self test routines invoking a debugger for the modification of panel parameters might also have been provided. In either case, the following problems exist with this solution:

1. These routines must still be debugged and married to the panel. Unfortunately the application software normally takes precedence over self-test, and many times these routines are watered down in order that schedule be met.

2. The serial effort discussed earlier still exists.

3. Engineers must wade through the test set's software directory to find the names of the programs applicable to the self test on his panel.

4. Since self test routines vary in complexity and style from test set to test set, engineers are required to learn a different set of procedures for modifying similar types of parameters.

5. Test set malfunctions stagnate the repair cycle of the panel. The panel still requires the test set for all aspects of debug and repair.

U.S. patents of interest include U.S. Pat. No. 4,108,358 to Niemaszyk et al, which discloses a first unit which is a PROM dedicated for executive control functions and a second unit which is a RAM used as a scratch pad memory during test. Unit-under-test information is stored in external PROM cards. The combination of the executive test program and a PROM card automatically applies test paterns to the unit under test. Patents of general interest include U.S. Pat. Nos. 4,097,797 to Finet; 3,854,125 to Ehling et al; and 4,168,527 to Winkler; which disclose circuit testers adapted for testing standard electronic modules.

SUMMARY OF THE INVENTION

An object of the invention is to provide a maintenance port system which provides for easy off-line maintenance and repair of automatic panels interfaced to the test set computer bus.

The maintenance port system according to the invention comprises a maintenance unit, user prom, an available CRT terminal, and a prom software development package. This system accepts parametric definitions for an automatic panel as defined by the designer, and formats the panel data for display and modification on a CRT (cathode ray tube) terminal. Because the system controls the formats, standard display and modification procedures are then used for transmitting and receiving parameters and are the same from panel to panel. Description of each element in the maintenance port system is as follows:

The maintenance unit is comprised of one or more digital boards designed to interface to the automatic panel at its test set computer bus connection. In addition, the maintenance unit has a communications port designed to interface a commercially available CRT terminal, and has an easily accessible socket(s) for the user prom(s).

Internal to the maintenance unit is a root memory that, by itself, will not provide for transfer of data to and from the automatic panel. The root memory, however, has routines that provide the following:

CRT communications routines
Command interpretation and execution routines
Standard parameter format routines
Parameter input/output drivers
Error information
Help and list commands
Parameter select and modification routines Because these routines are available in the maintenance unit, user prom software may be developed without the using assembly or microcode instructions of the maintenance unit. Development software may be used instead.

The user prom contains the parameter commands and signatures necessary to control the automatic panel. Inserting the prom into the maintenance unit configures the maintenance port specifically for the automatic panel for which the user prom was designed. The user prom has the following information:
Unique command table containing parameter names
Unique text for describing panel parameters Small command modules that call proper root memory formats for selected parameter Parameter signatures used by root memory software With the user prom installed, an engineer can call up and modify panel parameters via the CRT.

The prom software development package contains programs that allow the engineer to generate user prom microcode prom panel parameter information he provides. Since the package is tailored to the root memory software, all addressing and formatting of panel parameters is resolved and microcode generated transparent to the engineer. Thus, when he inputs parameter name, signature and desired text to the package, the resulting output is an object code file that when entered onto a blank prom will create the user prom.

Areas of Use

1. The maintenance port concept is being employed experimentally in several systems, including the Target Controller for the Improved System Bench for the radar system of the F-16 fighter aircraft. Here, the maintenance unit is a board that resides in the panel instead of as a stand-alone unit. The board is in this panel because there was a need to scale and display range, velocity, acceleration, and attenuation information during normal system test. The main program dedicated to this particular function has been placed in user prom. During normal operation, then, the port is inactive and the main program runs uninterrupted.

When the panel is removed from the test set, and mode switch on the board set properly, the maintenance port is active. Commands (i.e. parameter names) may then be entered via a CRT terminal without disrupting the updating function of the main program. Parameters have the potential of being displayed in any or all of the following formats: HEX, OCTAL, DECIMAL, BINARY, SCALE (i.e., 1DB/BIT, 256 FT/BIT, etc). Mode words are defined bit by bit in a standard format. The standard display test and display phrase routines in the root prom are designed such that a standard template for similar modes and unique phrases for a particular mode are meshed together in an easy to read display format. The special "phraseology", of course, appears in user prom as merely a set of pointers to dictionary words and phrases complete with the appropriate delimiters. Display of this text requires only that the correct pointer be loaded prior to calling a root prom subroutine. A sample of root and user prom software is attached.

2. The maintenance port system may be used in the troubleshooting of newly designed automatic panels without the delays incurred due to problems in the manufacturing and/or development of the test set and associated software.

3. Maintenance units may be placed in the field depots. Then, when automatic panels are delivered to the depots, user proms may also be delivered for checkout and repair of the panels.

4. Commercially, any company actively engaged in the design and manufacture of automatic panels through the entire life cycle of the panels. NOTE: The maintenance port system should not be construed as a replacement for an automatic test set's self test software. (All automatic test sets should have well-written self-test routines that provide levels of confidence in their operation.) The maintenance port system, instead, standardizes the way in which all automatic panels are maintained.

Features

1. The maintenance port system is unique in that it may be used for the debugging and checkout of any panel designed to interface a well-defined computer bus without requiring the computer, application software, or test set.

2. The maintenance unit is unique in that it is the common element used in the checkout of any panel with the same bus interface structure regardless of the panel's parameteric definition and regardless of which test set the panel is assigned.

3. The root memory residing in the maintenance unit is unique in that it is the means by which the formatting and display of any parameter from any panel is standardized.

4. The maintenance port system is unique in that it provides for standard procedures by which any parameter from any panel may be displayed and modified.

5. The user prom, root prom, and prom development package is unique in that it provides a method for anyone to develop user prom object code without requiring that he learn the assembly language used by the maintenance unit.

6. The maintenance port system is unique in that is easily reconfigurable for any panel designed for the same bus. A user prom is all that is required.

APPENDIX

An 83-sheet document with CODE IDENT 18323 titles "Test Set Bus Maintenance Port—Technical Description", which includes drawing 2140D61 for the circuit board for the maintenance unit is attached to the application as filed. An appendix herein includes sheets of the document on which appear the drawing 2140D61, tables referenced in the specification, and some other sheets. All other matter in the document has been incorporated in the specification and drawings herein.

BRIEF DESCRIPTION OF THE DRAWINGS

FIGS. 2A to 2E comprise a more detailed block diagram at the chip level of the unit shown in FIG. 2;

FIG. 3 is a timing diagram showing the bus protocol for read and write cycles;

FIG. 3A is a timing diagram for the data transfer cycles;

FIG. 5 is diagram showing a typical mode test module;

FIG. 6 is a diagram showing a typical register header display;

FIG. 7 is a diagram showing a parametric definition table data structure;

FIG. 9 is a diagram showing input parameters;

FIG. 10 is a diagram showing a scale table data stamp;

FIGS. 11 is a diagram of a swithology table data stamp;

FIG. 12 is a diagram of a sync table data stamp;

FIG. 13 is a diagram of an address definition table data stamp;

FIG. 19 shows a non-mode register display example;

FIG. 20 shows a mode register header display example;

FIG. 24 is a flow chart showing mode2 operation;

DETAILED DESCRIPTION

Figure 1:
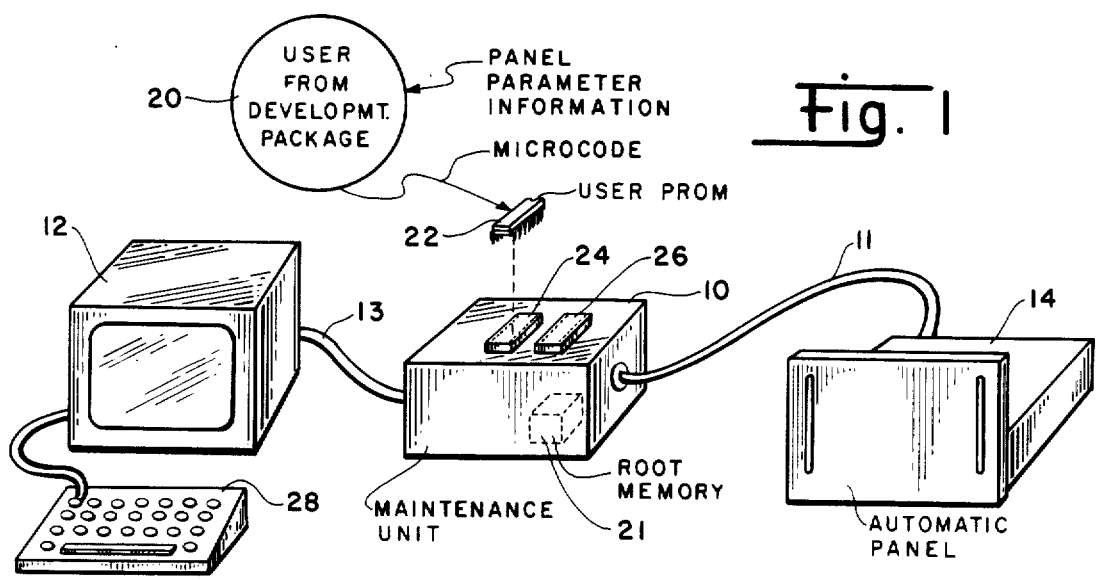
FIG. 1 is a pictorial block diagram of a maintenance port system according to the invention.

Referring to FIG. 1, the maintenance port system comprises a maintenance unit 10, user prom 22, an available CRT terminal 12, and a prom software development package 20.

The maintenance unit 10 is comprised of one or more digital boards designed to interface to an automatic panel 14 at its test set computer bus connection via a bus 11. In addition, the maintenance unit has a communications port designed to interface a commercially available CRT terminal 12 via a cable 13, and has easily accessible sockets 24 and 26 for the user proms. The terminal 12 may be a type CIT-101 terminal coupled to the maintenance port via an RS232 data link 13, providing the main communications link between an operator and the maintenance port system. Commands are entered by the operator via a standard plug-in keyboard 28 and displayed as described in a Software Dictionary 7433A02.

The maintenance port was designed for communicating across a defined "Test Set Bus Interface" used for line replaceable unit and system level test sets of a radar system IAPG-66 used in the F16 fighter aircraft. The purpose of the bus is to provide for orderly transfer of information between an Eclipse/S130 host computer and automatic panels located in the test set. Bus protocol for the read and write cycles is depicted in FIG. 3.

At the beginning of each read and write cycle, a parameter select code is output onto the test bus. The select code chosen corresponds to the address of the register or memory location in the automatic panel that is to be accessed by the computer. A subsequent input or output data strobe is then issued by the computer to complete the data transfer.

The maintenance port 10 allows the operator to bypass the computer and control the automatic panel. Software Dictionary 7433A02 describes the software operations that may be performed for a particular panel.

Internal to the maintenance unit is a root memory 21 that, by itself, will not provide for transfer of data to and from the automatic panel. The root memory, however, has routines as described above in the summary of the invention.

Figure 2:
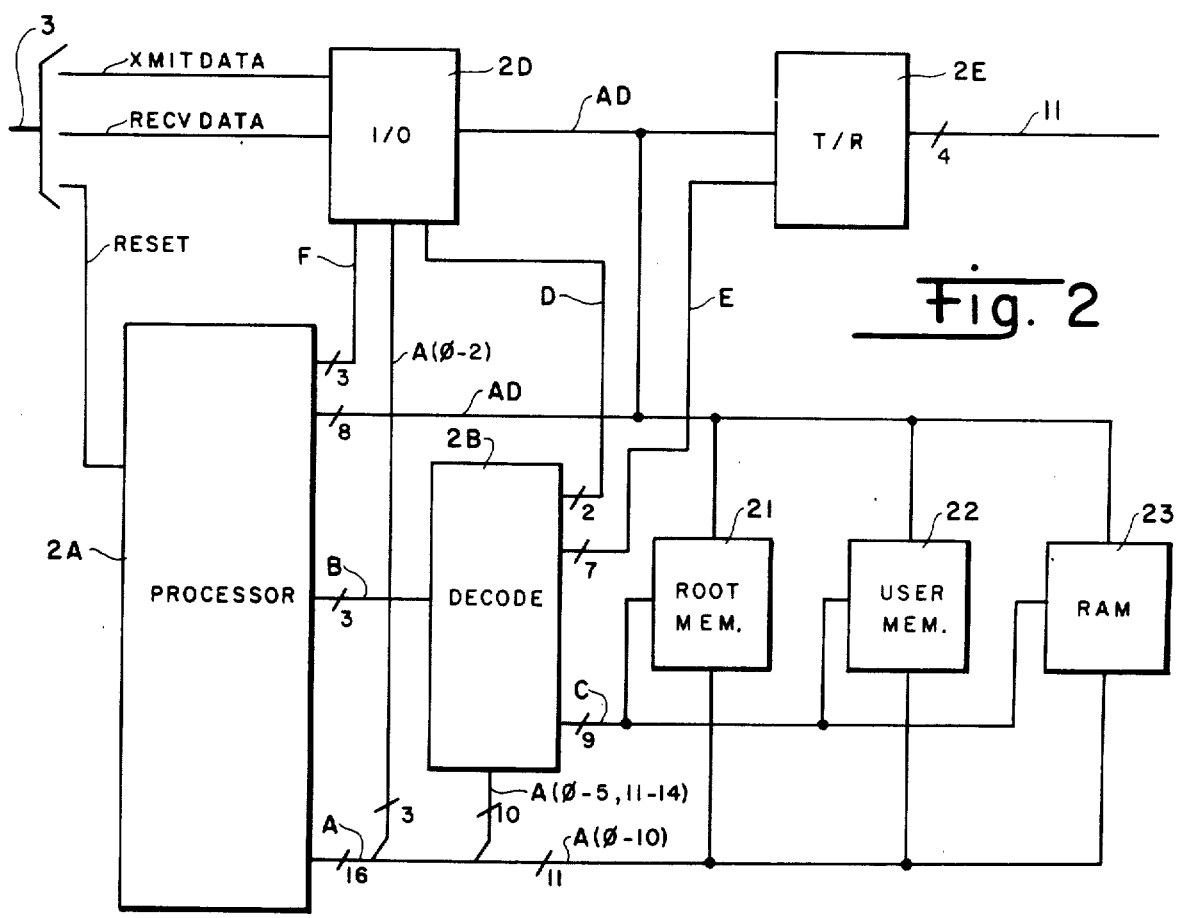
FIG. 2 is a block diagram of a maintenance unit for FIG. 1.

As shown in FIG. 2, the maintenance unit is a single board microcomputer comprising a processor 2A having an eight-bit multiplexed address/data bus AD and an address bus A, a decode section 2B, a root memory 21, a user memory 22, random access memory 23, the input/output communications port 2D, and a transmit/receive interface 2E. The cable 13 from the CRT terminal is connected to the communications port 2D, with a lead RESET also connected to the processor 2A. The bus 11 is connected to the interface unit 2E. The internal address bus A connects the processor 2A to the decode section 2B, the communications port 2D, and to the memories 21, 22 and 23. The internal data bus AD connects the processor 2A to the communication port 2D, the interface 2E, and to the memories 21, 22 and 23. The decode section 2B has inputs via ten of the leads of the address bus A and and control signals on line B from the processor to provide read or write signals and select one of the memories via a line C, the communications port 2D via line D, or the interface unit 2E via line E. Some signals are also supplied to/from the communications port 2D via a line F. The bus AD provides for transfer of data in eight-bit bytes between the processor 2A and any of the other sections on the board except the decode section 2B.

In FIGS. 2A-2E, integrated circuit chips are identified by reference characters having three characters identifying a chip, and a fourth character designating a device on the chip if shown separately in the drawing. Gates and some other devices are from the 74LS family of digital circuits. For convenience, the prime symbol (') is used with the reference characters on signal leads to show that the active signal condition is the inverted or low level.

Figure 2A:
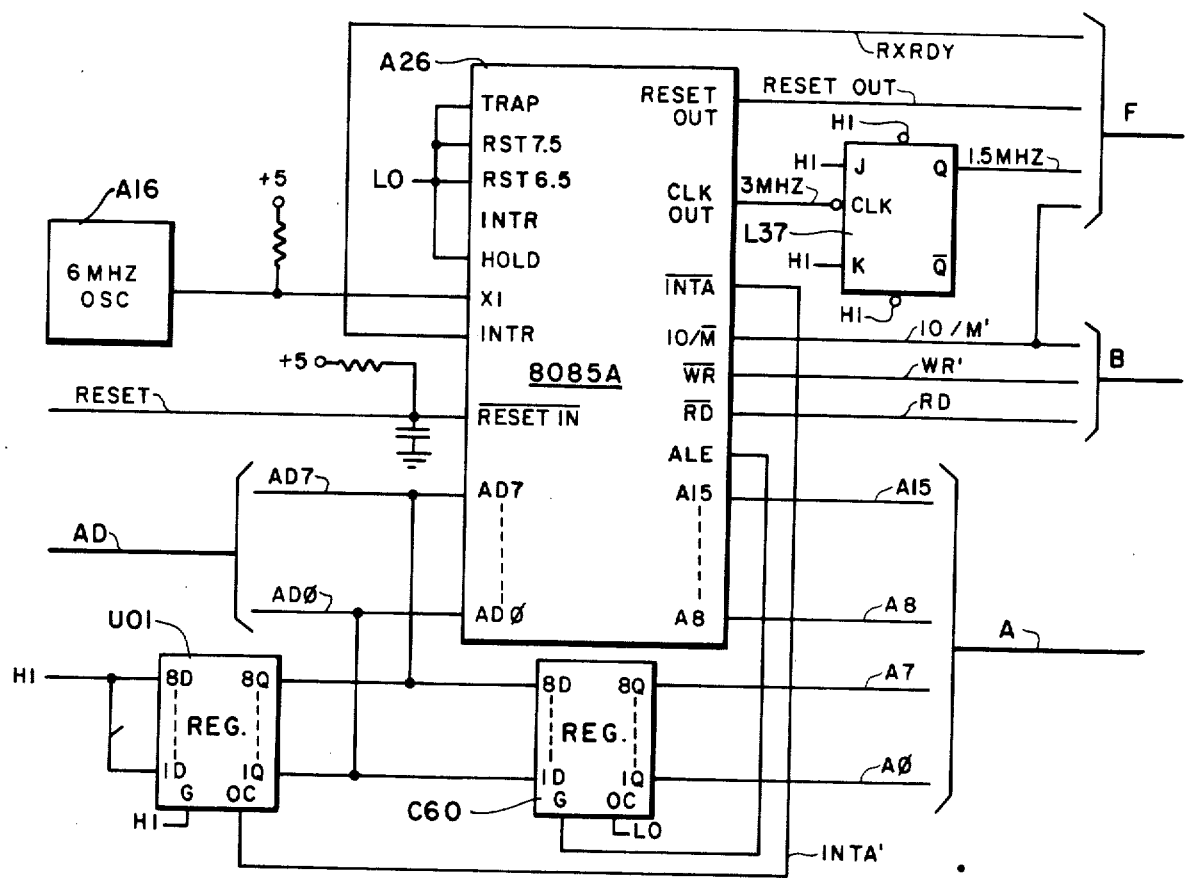

Referring to FIG. 2A, the processor comprises an 8085A microprocessor A26. Also shown in FIG. 2A are two registers U01 and C60, a 6-MHz oscillator A16 (IC type S14-R1) coupled to terminal X1 of the microprocessor, and a JK flip flop L37 (IC type 74LS112A) coupled between terminal CLK OUT at 3 MHz and a 1.5 MHz lead of line F. The registers here and in FIG. 2E are IC type 74LS373 octal D-type latches having eight inputs 1D-8D and eight corresponding outputs 1Q-8Q. Input to the D terminals is controlled via an input G biased HI when not used, and output from the Q terminals is controlled via an input OC biased LO when not used. The eight D inputs of register U01 are connected together to the a HI bias potential, and the Q outputs are connected respectively to leads AD0-AD7 of the bus AD. A signal from terminal INTA' of the microprocessor to terminal OC of register U01 makes all leads of bus AD high. All inputs from the keyboard generate an interrupt to the 8085 microprocessor. To process the interrupt, the microprocessor issues an interrupt acknowledge signal INTA'. The function of latch U01 is to provide a RST7 interrupt vector to the microprocessor upon receipt of the INTA' signal. The microprocessor uses the RST7 vector to invoke the Maintenance Port CLI.

The 8085A microprocessor A26 has the capability of directly addressing 64K bytes of memory and 256 I/O ports. During a typical instruction cycle, the microprocessor will output the lower byte of address onto the address/data bus AD, will output the upper byte of address onto lines A8 thru A15 of the address bus A, and will issue an Address Latch Enable (ALE) strobe (which is coupled from terminal ALE to input G of register C60). This forms the memory address by strobing the low eight bits of address into register C60 and concatenating these bits with the upper eight bits from the processor. The resulting address (A0 thru A15) is then operated upon by decoders of the decoder section 2B to determine which section of memory is to be accessed.

Figure 2B:
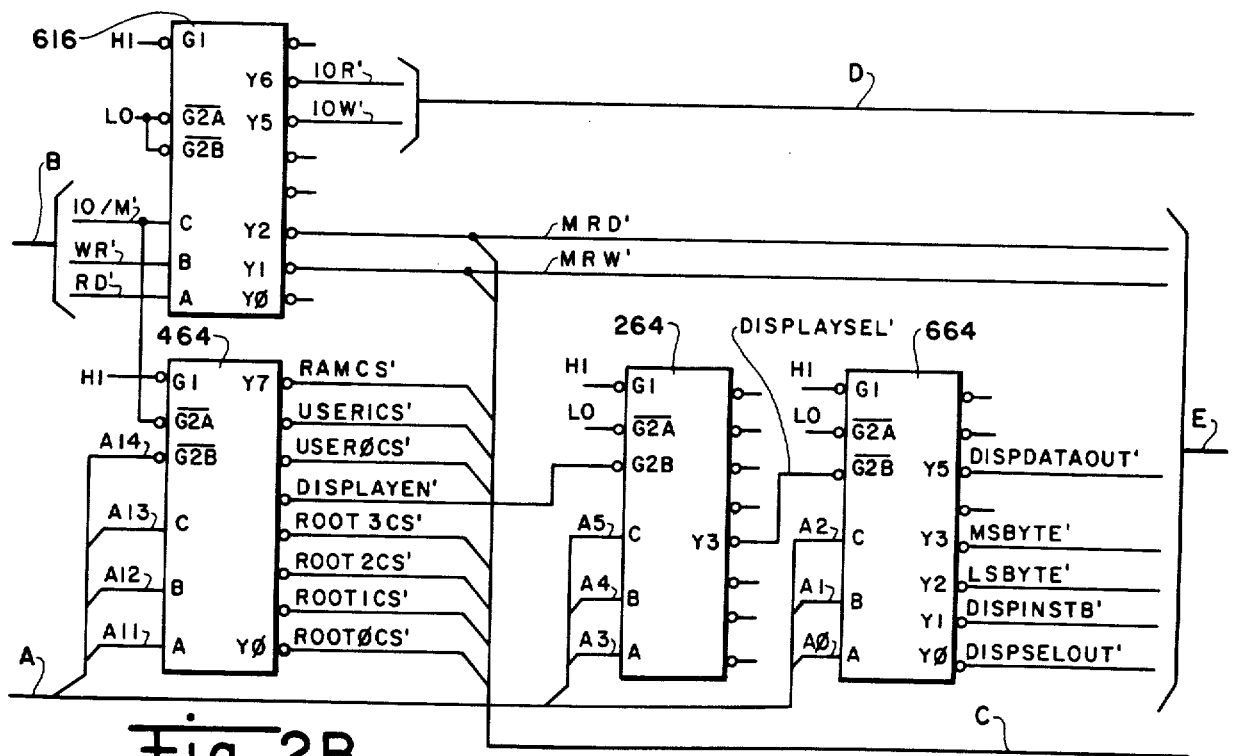
Figure 2D:
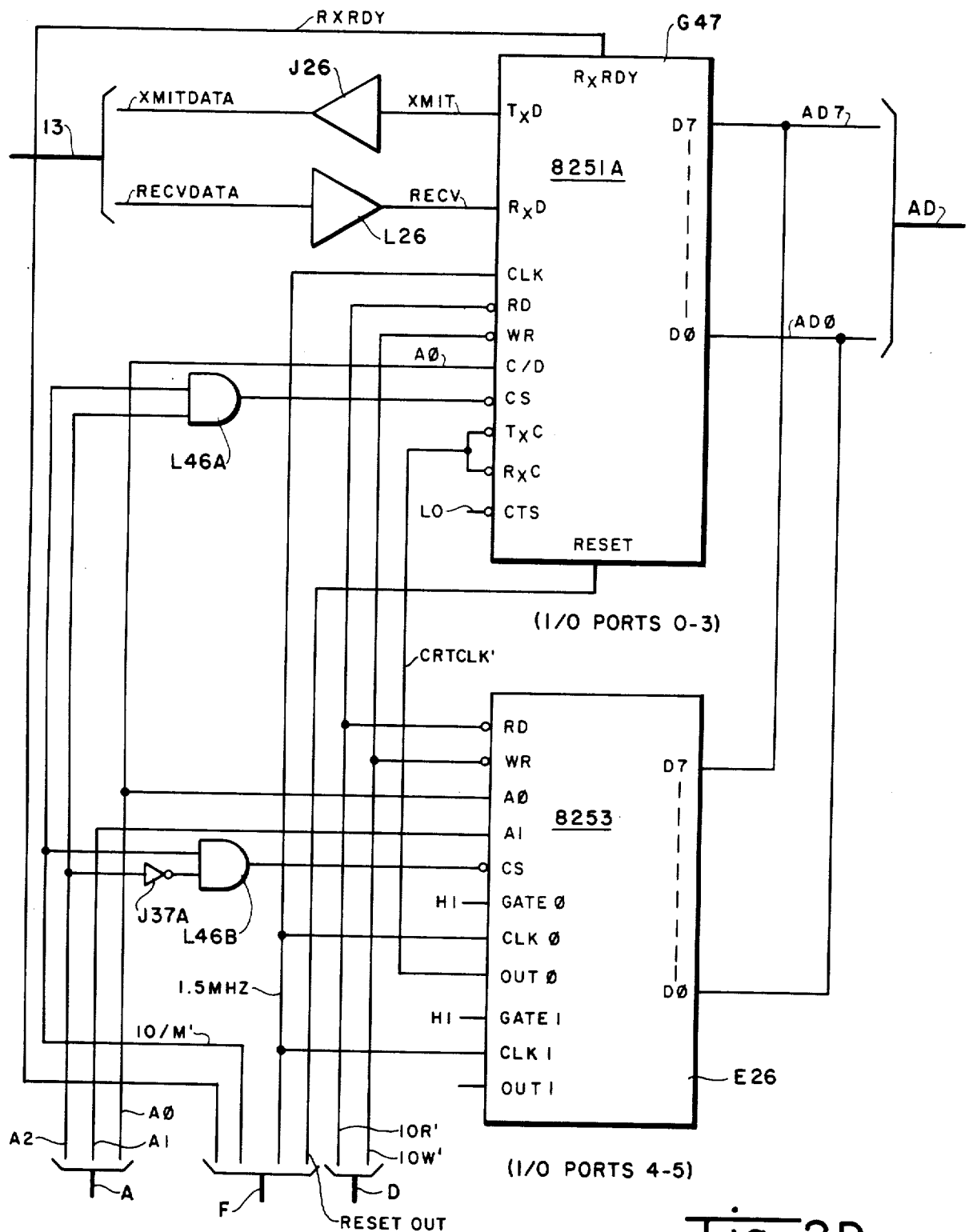
Figure 2E:
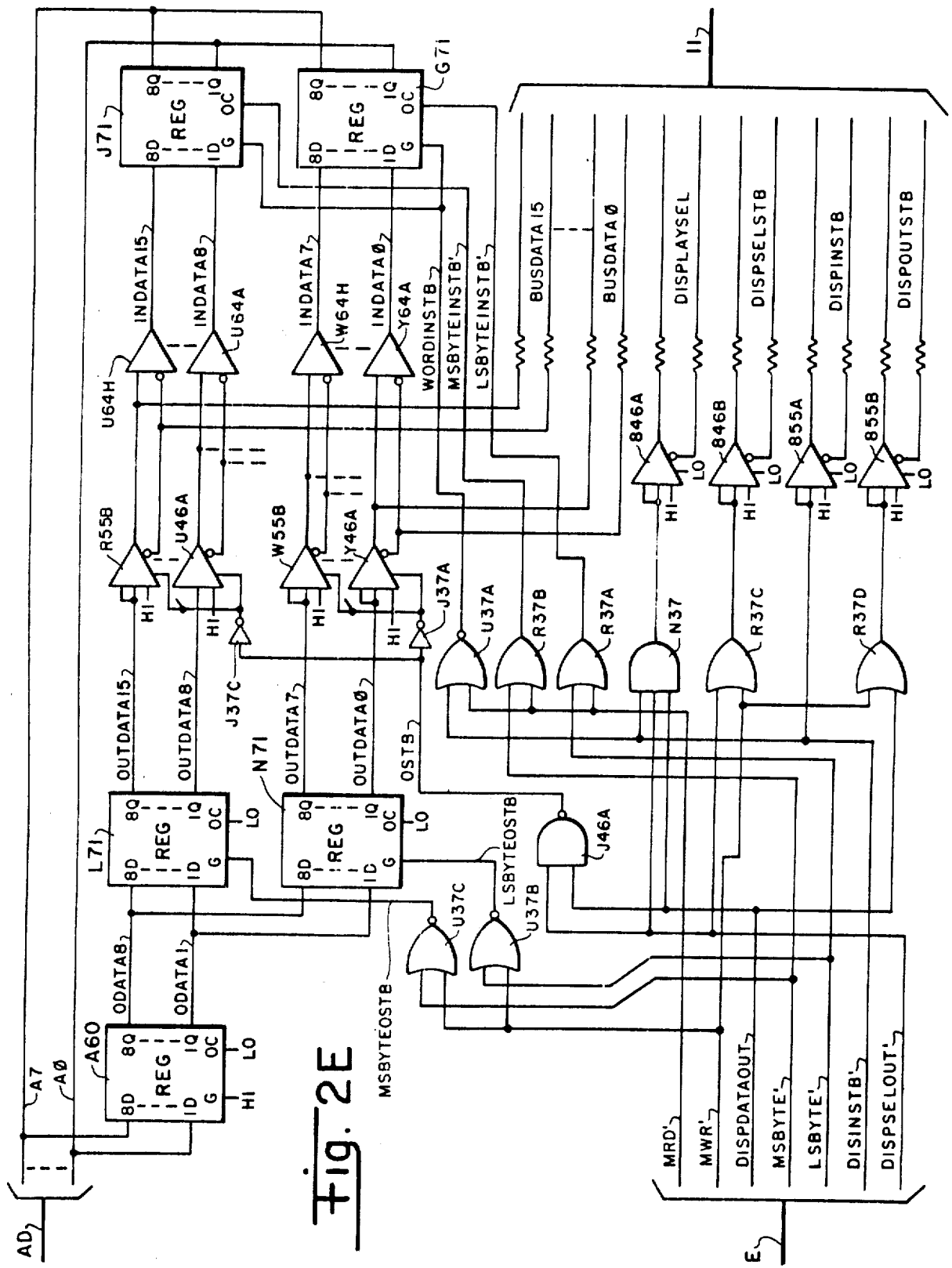

The decoder section 2B shown in FIG. 2B comprises four decoders 616, 264, 464 and 664, which are each an IC type 74LS138. Each has three address inputs A, B and C, which are decoded to eight outputs Y0-Y7, A gate input G1 biased HI, and two gate inputs G2A' and G2B' which are internally OR'd. Gate G2A' in all four devices, and gate G2B' in device 616, are biased LO. Signals on leads RD', WR' and IO/M' from corresponding terminals of the microprocessor are connected via line B to inputs A, B and C of decoder 616. The decoded outputs at terminals Y1 and Y2 provide signals on leads MRW' and MRD' for write and read control signals to the memory and the interface 2E. The decoded outputs at terminals Y5 and Y6 provide signals on leads IOW' and IOR' for write and read control signals to the input/output port 2D.

The decoder 464 has inputs A, B, C and G2B' connected respectively to address leads A11, A12, A13 and A14, so that when address bit A14 is low, the address bits A11, A12 and A13 are decoded to determine a section of memory to be accessed. The signals from terminals Y0-Y3 on the four leads ROOT0CS, ROOT1CS, ROOT2CS and ROOT3CS are for selection of a chip of the root memory 21, the signals from terminal Y4 to lead DISPLAYEN' controls selection of an address of the interface 2E, the signals from terminals Y5-Y6 on the two leads USER0CS and USER1CS are for selection of a chip of the user memory 22, and the signal RAMCS' from terminal Y7 controls selection of an address of the random access memory 23.

The lead DISPLAYEN' is connected to input G2B of decoder 264. When the signal is low, address bits A3, A4 and A5 at inputs A, B and C are decoded at terminal Y3, and the signal via lead DISPLAYSEL' enables decoder 664 at input G2B'. Decoder 664 has address bits A0, A1 and A2 at its inputs A, B and C. The outputs are DISPSELOUT' at terminal Y0, DISPINSTB' at terminal Y1, LSBYTE' at terminal Y2, MSBYTE' at terminal Y3, and DISPDATAOUT' at terminal Y5. These outputs along with leads MRW' and MRD' are connected via line E to the interface 2E.

The root memory 21 and the user memory 22 shown in FIG. 2C comprise 2K×8 IC PROM chips thype 2716. The root memory 21 shown as a single block comprises four chips A01, D01, G01 and K01 to form an 8K×8 memory having hexadecimal addresses 0000-1FFF. The eleven address leads A0-A10 are connected in multiple to the corresponding inputs of all four chips, and the eight outputs O0-O7 of the four chips are connected in multiple to the leads AD0-AD7. The lead MRD' is connected to pin 20 of all four chips, and the four leads ROOT0CS, ROOT1CS, ROOT2CS and ROOT3CS are connected respectively to pin 18 of the four chips for chip selection.

The user memory 22 shown as a single block comprises two chips A47 and D47 to form an 4K×8 memory having hexadecimal addresses 2800-37FF. The eleven address leads A0-A10 are connected in multiple to the corresponding inputs of both chips, and the eight outputs O0-O7 of the two chips are connected in multiple to the leads AD0-AD7. The lead MRD' is connected to pin 20 of both chips, and the two leads USER0CS and USER1CS are connected respectively to pin 18 of the two chips for chip selection.

The RAM memory 23 shows as a single block plus some gate circuits comprises four chips E60, G60, N01 and R01 IC type 2114 to form an 2K×8 memory having hexadecimal addresses 3800-3FFF. The ten address leads A0-A9 are connected in multiple to the corresponding inputs of all four chips. The four I/O terminals of two chips G60 and R01 are connected in multiple to the leads AD0-AD3, and the four I/O terminals of the other two chips E60 and N01 are connected in multiple to the leads AD4-AD7. The lead MWR' is connected to the write enable input WE of all four chips. An AND gate 864A has inputs from leads MWR' and MRD', and an output via lead MRDWR' to an input of an OR gate N46A. Another input of gate N46A is from lead RAMCS', and its output is via lead RAMSEL' and chip selection OR gates N46B and N46C. Address lead A10 is connected directly to gate N46B, and via a gate L46C connected as an inverter to gate N46C. Thus when the signal on either the write control lead MWR' *or* the read control lead MRD' is low, and the RAM select signal on lead RAMCS' is also low, one of the chip select gates N46B or N46C has a low output, depending on whether A10 is high or low. The output of gate N46B on lead RAM1' is connected to the inputs CS1 of two chips G60 and R01, and the output of gate N46C on lead RAM2' is connected to the inputs CS2 of two chips E60 and N01.

In this system memory is mapped as follows:

| Address Range | Type | Description |
| --- | --- | --- |
| 0000 thru 1FFFF | prom | root memory |
| 2018 | memory-mapped I/O | parameter select strobe |
| 2019 | memory-mapped I/O | input data strobe |
| 201A | memory-mapped I/O | lower data byte |
| 201B | memory-mapped I/O | upper data byte |
| 201D | memory-mapped I/O | output data strobe |
| 2800 thru 37FF | prom | user memory |
| 3800 thru 38FF | ram | ram memory |

Each section of memory is defined below:

(1) Root Memory—Programs residing in the root memory 21 are not dependent on the registration definitions of any automatic panel connected across the bus. Instead, root memory programs are general purpose routines that communicate with the CRT and standardize the formatting of information received from the automatic panel 14. Programs residing in the root include:
CRT I/O drivers and interrupt service routines
Test Set Bus I/O drivers
Standard register mode display and modification routines
Standard memory mode display and modification routines
Program load and execute routines
Root memory dictionary
Root memory texts
Register and memory display templates (2) Parameter Select Strobe—The "DISPLSELSTB" control signal from the maintenance unit 10 is the parameter select strobe that is used by the automatic panel to latch parameter select address appearing on the bus.

(3) Input Data Strobe—The "DISPINSTB" control signal is the input data strobe that is used by the microprocessor to transfer data from the automatic panel to the maintenance port.

(4) Output Data Strobe—The "DISPOUTSTB" control signal is the output data strobe that is used by the automatic panel to latch data from the maintenance port into the register designated by the parameter select.

(5) Lower Data Byte, Upper Data Byte—The Test Set Bus is defined to be a sixteen bit bi-directional parallel data bus. The 8085 microprocessor, however, is an eight bit machine. Consequently, data destined for the automatic panel must be pre-assembled—low byte first, then high byte—prior to initiating the transfer. Registers L71 and N71 (FIG. 2E) and their corresponding "MSBYTE-" and "LSBYTE-" strobes accomplish this pre-assembly. Similarly, data read from the automatic panel must be disassembled by the 8085 a byte at a time. Registers G71 and J71 present the test set bus data in sections to the microprocessor.

(6) User Memory—Whereas the root memory is structured independent of automatic panel definition, the user memory 22 presents a portrait of the panel to the maintenance port. For each automatic panel to be mated to the maintenance port, there must be a unique pair of user proms describing the panel. In effect the user proms "marry" the automatic panel to the maintenance port.

Unlike the root memory, the user memory does not contain software programs and subroutines. Instead, registration information about the panel is structured in strict tabular formats that are defined by the root. Data stored in the user memory tables include:
Parameter command names
Root memory program vector table
User dictionary
Parameter texts
Parameter definition tables (7) Ram—Ram memory 23 is available for stack and scratchpad operations performed during program execution.

In addition to this memory configuration, the maintenance unit 10 also has an I/O port structure 2D (FIG. 2D) that is solely dedicated to communication with the CRT terminal 12. The port structure consists of an 8253 programmable timer G47 and an 8251A programmable communications interface or usart E26. The eight leads of line AD are connected respectively to eight terminals D0–D7 of each of the devices G47 and E26. The device G47 has a terminal $R_XRDY$ connected to interrupt lead RXRDY of line F; a terminal $T_XD$ coupled via a line driver J26 (IC type MC 1488) to lead XMITDATA, a terminal $R_XD$ coupled via a line receiver L26 (IC type MC 1489) from lead RECVDATA, a terminal CLK connected to lead 1.5 MHz, a terminal RD' connected to lead IOR', a terminal WR' connected to lead IOW', a terminal C/D' connected to lead A0, a terminal CS connected to the output of a gate L46A, terminals $T_XC'$ and $R_XC$ connected via line CRTCLK' to terminal OUT 0 of device E26, a terminal CTS connected to LO bias, and a terminal RESET connected to lead RESET OUT. The device E26 has a terminal RD' connected to lead IOR', a terminal WR' connected to lead IOW', a terminal A0 connected to lead A0, a terminal A1 connected to line A1, a terminal CS connected to the output of a gate L46B, terminals GATE 0 and GATE 1 connected to HI bias, terminals CLK 0 and CLK 1 connected to lead 1.5 MHz, and a terminal OUT 1 unconnected. Lead IO/M' is connected to inputs of AND gates L46A and L46B. Lead A2 is connected directly to an input of gate L46A, and via an inverter J37A to an input of gate L46B.

The timer is responsible for establishing a frequency that is equal to the baud rate of the terminal connected to the port. The frequency (CRTCLK-) establishes the rate at which ASCII characters are transmitted or received by the 8251A. The I/O port assignment is as follows:

| Port Address | Description |
|---|---|
| 0 thru 3 | 8253 timer |
| 4 thru 5 | 8251A usart |

The transmit/receive interface 2E shown in FIG. 2E provides the interface with bus 11. The bus provides for two-way transmission of data comprising sixteen bits, each bit having two leads in bus 11 coupled via resistors to outputs of line drivers and to inputs of line receivers. There are also four pairs of leads in bus 11 coupled via resistors to the outputs of command line drivers. The line drivers are IC type 7832 having two devices per chip. The data line driver chips are designated by references Y46, Y55, W46, W55, U46, U55, R46, and R55, with the drawing showing devices Y46A, W55B, U46A and R55B for data bits 0, 7, 8 and 15. The line receivers are IC type 26LS33 having eight devices per chip, designated by references Y64 and U64, with the drawing showing devices Y64A, Y64H, U64A and U64H for data bits 0, 7, 8 and 15. The command line drivers are designated 846A to bus pair DISPLAYSEL, 846B to bus pair DISPSELSTB, 855A to bus pair DISPINSTB, and 855B to bus pair DISPOUTSTB.

The interface 2E includes five 74LS373 D-type octal registers. Register A60 has its D input connected respectively to the eight leads of line AD, and its Q outputs connected respectively via eight leads ODATA-1–8 to the D inputs of two registers N71 and L71. The input gate terminal of register A60 is connected to HI bias, and the output control terminals of the three registers A60, N71 and L71 are connected to LO bias. NOR gates U37B and U37C each have an input from lead MWR', respective inputs from leads LSBYTE' and MSBYTE', and respective outputs via leads LSBYTEOSTB and MSBYTEOSTB to the gate terminals G of the two registers N71 and L71. These gates permit the 16 bits for the bus to be assembled a byte at a time from line AD and register A60, with one byte into the register N71 and the other byte into register L71. A NAND gate J46A has inputs from leads DISPSELOUT' and DISPDATAOUT', and an output via lead OSTB and inverters J37A and J37C to enable the sixteen data bus drivers simultaneously, to transfer data from the Q outputs of the two registers via 16 leads OUTDATA0–15 and the 16 drivers to the bus data pairs BUSDATA0–15.

The eight line receivers Y64A–Y64H have outputs connected via leads INDATA0–7 to the D inputs of register G71, and the eight line receivers U64A–U64H have outputs connected via leads INDATA8–15 to the D inputs of register J71. A NOR gate U37A has inputs from lines DISINSTB' and MRD', and an output connected via lead WORDINSTB to the G inputs of both registers G71 and J71, to load 16 bits of data from the bus into the registers. NOR gates R37A and R37B each have an input from lead MRD', respective inputs from leads leads LSBYTE' and MSBYTE', and respective outputs via leads LSBYTEINSTB' and MSBY- TEINSTB' to the output control terminals OC of the two registers G71 and J71. These gates permit the 16 bits from the bus to be supplied via line AD a byte at a time.

An AND gate N37 has inputs from leads DISINSTB', DISPSELOUT', and DISPDATAOUT and an output to the bus driver 846A to supply a command to the bus pair DISPLAYOUT. An OR gate has inputs from leads DISPELOUT' and MWR', and an output to driver 846B to supply a command to bus pair DISPSELSTB. Lead DISINSTB' is connected to driver 855A to supply a command to bus pair DISPINSTB'. An OR gate R37D has inputs from leads MWR and DISPDATAOUT' and an output to driver 855B to supply a command to bus pair DISPOUTSTB.

Hardware Operation

Commands for displaying and modifying automatic panel parameters are communicated to the maintenance unit 10 via the CRT terminal 12 (FIG. 1). Each character, as typed by the operator, is received via lead RECVDATA and the receiver L46 by the 8251A device G47 (FIG. 2D) and an interrupt on lead RXRDY is generated. Upon recognizing the interrupt, the microprocessor A26 (FIG. 2A) suspends current program execution and vectors to the CRT interrupt service routine located in root memory.

The CRT interrupt routine inputs the ASCII character from the 8251A usart device G47 via line AD and stores the character in a command buffer located in ram memory 23. When the entire command line has been entered, the microprocessor attempts to execute the command. If the command is invalid, approriate error messages are sent to the terminal via the 8251A transmit port T_XD, driver J26, and lead XMITDATA. Otherwise, data is read from or sent to the automatic panel across the test set bus 11 as dictated by the command.

Output Data Cycle:

When data is to be loaded into the automatic panel, the output data cycle of FIG. 3 is performed. The cycle begins with the execution of an "SHLD 201AH" instruction. The SHLD instruction transfers the parameter select code from the HL register pair in the microprocessor A26 via line AD and register A60 (FIG. 2E) to holding registers L71 and N71. The output strobes (LSBYTEDSTBand MSBYTEOSTB-) are also generated to complete the byte parallel transfer.

After the parameter select is latched into the holding registers, a parameter select strobe is synthesized via an "STA 2018A" instruction. When the STA instruction is executed, the "DISPSELOUT-" signal enables output drivers Y46A thru R55B setting the OSTB controls high, which via inverters J37B and J37C supplies a low signal to the control inputs of the drivers. With the output drivers enabled, the parameter select address residing on the holding registers appears on the Test Set Bus 11. A subsequent "DISPSELSTB" signal is then generated from the "DISPSELOUT-" control line and the memory write strobe (MWR') from the processor. In this port system, the DISPSELSTB' signal is the synthesized parameter select strobe for the test set bus.

After the parameter select is transferred to the panel, parameter data may then be output onto the bus. Parameter data is transferred to the panel in a manner similar to the method used for sending the parameter select. An "SHLD 201AH" instruction is used once again to load holding registers L71 and N71 with data from the microprocessor. A subsequent "STA 201DH" instruction is then issued to route the data thru the bus drivers onto the Test Set Bus. Instead of producing a "DISPSELSTB'" signal, however, a "DISPOUTSTB" strobe is generated. In this port system, the "DISPOUTSTB" strobe is the synthesized output data strobe that is needed by the automatic panel for latching parameter data.

Input Data Cycle:

When data is to be read from the automatic panel, the input data cycle of FIG. 3 is performed. The first half of the input data cycle is identical to the output data cycle described above. The "SHLD 201AH" and "STA 2018H" instructions send the parameter select address to the automatic panel. It is from this address that data will be input to the microprocessor.

During the last half of the input data cycle, an "LDA 2019H" instruction is executed. This LDA instruction generates an input data strobe "DISPINSTB" that transfers parameter data from the panel to holding registers G71 and J71. A subsequent "LHLD 201AH" instruction is then issued to route the data—a byte at a time—to the microprocessor's HL register pair.

See Appendix I, sheet 20 (FIG. 4) for parameter select codes for output at addresses 0000-0077 and for input at addresses 8000-8077.

MAINTENANCE PORT SOFTWARE DESCRIPTION

Maintenance port software consists of an 8K memory 21 residing at address locations 0000H thru 17FFH and a 4K user memory 22 residing at address locations 2800H thru 37FFH. The root memory contains all of the executable code (i.e. programs and subroutines) for maintenance port operation. The user memory houses the automatic panel descriptions that accurately convey the panel's register and memory configuration to the root memory.

User Memory

Figure 4:
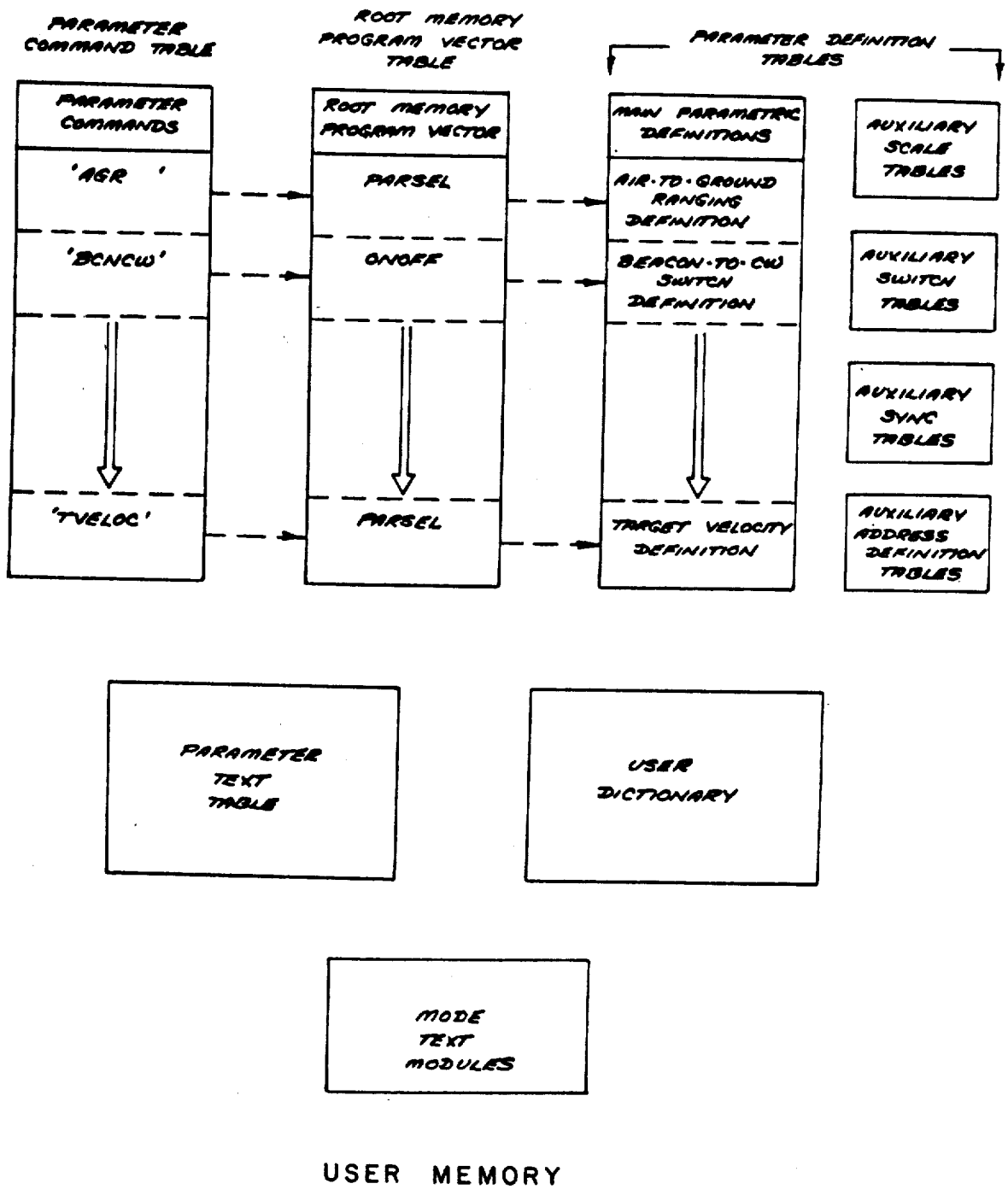
FIG. 4 is a is a block diagram showing the contents of the user memory.

FIG. 4 depicts the elements that comprise user memory. They are:
Parameter Command Table
Root Memory Program Vector Table
Parameter Definition Tables
Parameter Texts
User Dictionary
Mode Text Modules (1) Parameter Command Table—The Parameter Command Table is an alphanumeric listing of command names that have been assigned to each register and memory in the automatic panel. Generally, these names must be no more than six characters long and should, in some way, reflect the nature of the parameter. For instance, the command name "TRANGE" could be assigned to the register that controls target range for an automatic target controller panel.

A sample of a typical Parameter Command Table is depicted in Table I of Appendix I, sheet 23. Note that the parameter commands are listed in alphabetical order and that each name contains six characters each (counting spaces). Note also that the Parameter Command Table is terminated by the TBLEND delimiter "*". The root memory recognizes an asterisk as the standard delimiter for the Parameter Command Table. Consequently, the asterisk character should not be used in any command label.

Once a parameter command is keyed, the root memory scans the Parameter Command Table—six characters at a time—hoping to find a unique match for the entry. This search is conducted alphabetically until either unique match is found or until the entire table has been scanned.

(2) Root Memory Program Vector Table—The Root Memory Program Vector Table lists the root memory module that must be executed for any valid parameter command entered by the operator. As shown in FIG. 4, there is a one-to-one correspondence to the placement of the parameter command in the Parameter Command Table and the associated placement of the program vector in the Root Memory Program Vector Table.

There are four types of commands that may be identified in the Program Command Table: register commands, memory commands, switch commands, and sync commands. Each command type invokes a different root memory mode module during execution. Standard (non-mode) register commands invoke a routine called "PARSET" that displays that contents of the selected register. Mode registers also reference the "PARSET" routine but do so through a mode module driver in user memory that is specific to the mode. Memory commands invoke a routine called "MMORY" that reconfigures the maintenance port into the memory mode. And finally, switch and sync commands invoke the routine "ONOFF" that initializes the parameter register to some pre-determined software setting. Table II of Appendix I, sheet 25, depicts the Root Memory Program Vector Table that corresponds to the Parameter Command Table of Table I.

(3) Parameter Definition Tables—The Parameter Definition Tables are the automatic panel register and memory descriptions that are used to marry the maintenance port to the panel. The Parameter Definition Tables are discusssed in detail in the next section of this specification.

(4) Parameter Text Area—The Parameter Texts listed in the user memory are display messages that appear with the automatic panel register or memory data on the CRT of terminal 12. These messages are typically labels assigned to the parameter that highlight the purpose of the register or memory displayed by the port. The messages may be as simple as displaying "TARGET ACCELERATION" whenever acceleration data is to be accessed. On the other hand, the messages may describe the assignment and purpose of each bit for the "TARGET MODE" register.

Messages are accessed from the Parameter Text Area of user memory through vectors that are listed in the Parameter Definition Table. The structure of each parameter text is depicted in Table III of the Appendix, sheet 26. Each parameter text consists of an ordered string of dictionary word addressed that correspond to the message that is to be displayed. Each text is terminated by a "TXTEND" address delimiter to define the end of the message to the root memory.

(5) User Dictionary—Parameter texts listed in the Parameter Text Area of user memory reference the addresses of words and phrases that are to be output to CRT. The phrases and words referenced by the texts must reside in either the root or user dictionaries. The User Dictionary contains all words unique to the panel that do not appear in the Root Dictionary. Such "words" may be a "12.2946 FT/BIT" scaling factor or may be an "ANTENNA/DUMMY LOAD SELECT" phrase for defining a mode word bit.

Words listed in the user dictionary need not be alphabetized. (See the example in Table IV of the Appendix, sheet 27.) Each dictionary word is a collection or string of ASCII characters that is referenced by a pre-assigned label. Each string is terminated by an exclamation point "!". (The exclamation point is acknowledged by the root memory as the appropriate end delimiter for any dictionary word.)

(6) Mode Text Modules—When a mode text register is to be accessed by the maintenance port, a vector to a mode text module is listed in the appropriate slot in the Root Memory Progam Vector Table. Mode registers are those registers that are a collection of control bits used by the panel to set up and control its internal operations. Typically, each mode register bit is assigned a specific panel control function.

To self-document each bit assignment, a header message is displayed when the mode register command is executed. FIG. 6 shows one such display. Header displays appear on the CRT of terminal 12 in formats dictated by the root memory. Each header display identifies the bit number, function, and switching action of each mode bit.

The function of the mode text module is to reference the texts that are to be used in the creation of the header display for the mode register command keyed by the operator. The structure of a mode text module is illustrated in FIG. 5. The mode text module references two tables: a root memory text template table, and a user memory mode text table. The root memory text template is the "form" that dictates how the header will appear. The mode text table lists the phrases that will be used to "complete" the form.

When a header is to be displayed, that mode text module for the specified mode register is executed. During module execution, texts are referenced from the root memory text template, then from the mode text table, in alternating fashion until the entire header message appears on the terminal.

Parameter Definition Tables

The primary vehicles for communicating information about automatic panel registration to the root memory of the maintenance port are the parameter definition tables. Five parameters definition tables are stored in user memory. They are:
Main Parametric Definition Table
Auxiliary Scale Table
Auxiliary Switchology Table
Auxiliary Address Definition Table
Auxiliary Sync Table Main Parametric Definition Table All automatic panel parameters must be defined in the Main Parametric Definition Table. The Parametric Definition Table (FIG. 7) consists of several data stamps, each ten bytes in length. Each data stamp specifies the attributes and peculiarities of a single register or memory residing in the automatic panel. The relative position of the data stamp within the Main Parametric Definition Table depends on the assigned position of the register or memory command name within the Parameter Command Table. For the commands shown in FIG. 6, the "beacon-to-CW" data stamp is the second listed in the Parametric Definition Table and corresponds to the "BCNCW" command appearing in the Parameter Command Table.

Figure 8:
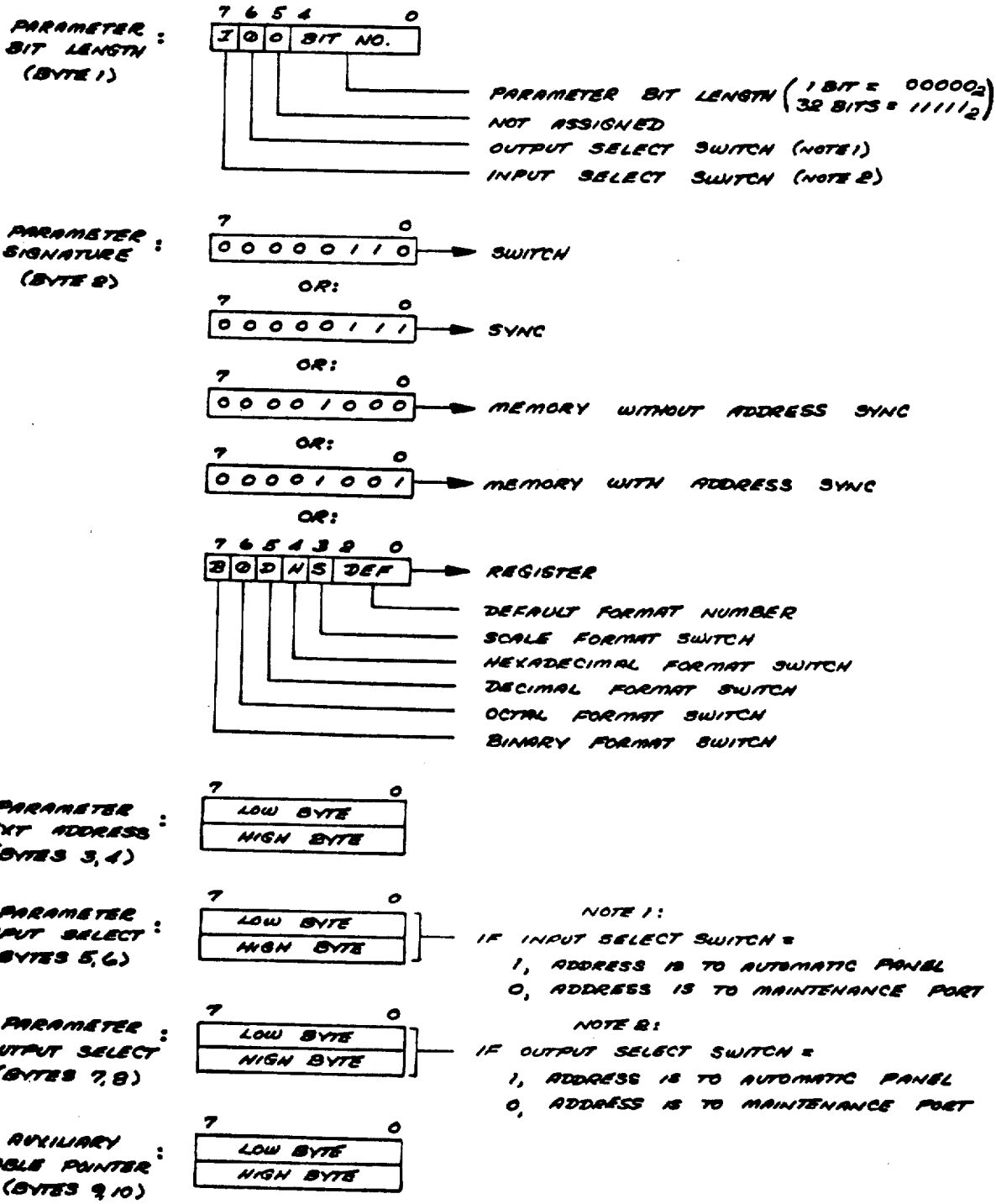
FIG. 8 is a diagram showing a parametric definition table data stamp.

FIG. 8 details the registration information that must be conveyed in each data stamp. Parameter definition data stamps are comprised of a parameter bit length, signature, text address, input and output selects, and auxiliary table pointer.

(1) Parameter Bit Length—The first data stamp byte is the Parameter Bit Length and I/O specification for the register or memory. The lower five bits identify the bit width (up to 32 bits) of the data. The upper two bits are I/O select bits that indicate whether the data can be input from or output to the panel.

The setting of the I/O select bits determine the type of parameter that the root memory is addressing. From FIG. 9, the parameters may be:
Input Parameters (proms, input latches, etc.)
Output Parameters (output latches, displays etc.)
Input/Output Parameters (rams, I/O latches, etc.)

Input parameters are those registers or memories that have an input select but no output select. Such parameters may only be read from the automatic panel and cannot be directly modified.

Output parameters are those registers that have an output select but lack an input select. Because an output registers has no input select, it cannot be read directly from the panel. Instead, all output parameters are assigned memory locations in maintenance port ram to act as pseudo-input registers. During maintenance port initialization, these registers are zeroed. After initialization, these registers track any modifications that may be made to the output parameters.

Finally, input/output parameters are those registers and memories that possess both input and output selects. These parameters may be initialized and monitored directly from the maintenance port.

(2) Parameter Signature—The second data stamp byte specifies the signature or "personality" of the parameter. From the parameter signature, the root memory can determine whether the parameter is a register, switch, sync, or memory. In addition, if the parameter is a register, the signature dictates to the root memory which of five display formats are acceptable for the register. Valid parameter signatures are listed in Table V of the Appendix, sheets 35 and 36.

If the parameter is a register, the parameter signature is divided into a five bit format switch field and a three bit default select field. The format switch field identifies which display formats are acceptable for viewing the register. One switch field bit has been established for each of the following data types:
Binary Data
Octal Data
Decimal Data
Hexadecimal Data
Scaled Data Formats are selected or deselected by setting the appropriate bits in the format switch field. A logic one in the most significant digit of the parameter signature, for instance, will select the binary data display option permitting the register to be displayed in binary.

Generally, more than one format may be selected for any given register. The purpose of the default field is to specify in which data format the register will be initially displayed. When the parameter command for the register is first received, register data is displayed in this defaulted format. Through subsequent keyboard entries, the operator may then cycle register data thru the remaining formats selected by the format switch field.

If the parameter is a switch, data 06H will be present in the parameter signature byte. A "switch" is defined to be any parameter command that directly modifies all mode register bits that select or deselect a specific panel function. When a switch parameter is indicated, the auxiliary table pointer in the Main Parametric Definition Table must reference the appropriate switch definition in the Auxiliary Switchology Table.

If the parameter is a sync, data 07H should appear in the parameter signature byte. Sync parameters are single or multiple bits of registers within the automatic panel that, when toggled from one known state to another, produce some interanl control signal. (Such a control signal might be a software strobe that enables a counting measurement.) When a sync parameter is indicated, the auxiliary table pointer in the Main Parametric Definition Table must vector the root memory to the appropriate sync data stamp in the Auxiliary Sync Table.

Finally, if the parameter is a prom, either data 08H or 09H will appear as the parameter signature. Any prom signature must be accompanied by an auxiliary table pointer that references the proper data stamp in the auxiliary address definition table.

(3) Paramter Text Address—The third and fourth data stamp bytes specify the parameter text address. The Parameter Text Address is a vector to an ordered sequence of dictionary words that applies a "real-world" label to the parameter. Such labels might be "TARGET RANGE". "MISCELLANEOUS MODE", or "CLUTTER BANDWIDTH".

When the parameter command is issued, the port will use the label referenced by the parameter text address to identify the data as it is displayed on the CRT.

(4) Parameter Input Select—The parameter's input select address occupies the fifth and sixth bytes of the Parametric Definintion Data Stamp. The input select address specifies the address from where register or memory data will be read. If the parameter has its input select bit set, the address references a memory or register location within the automatic panel. If, however, the parameter lacks an input select, the input select address identifies the maintenance port ram location that will serve as a pseudo-input register for the parameter.

(5) Parameter Output Select—The parameter's output select address occupies the seventh and eighth bytes of the Parametric Definition data stamp. The parameter output select qualifies where register or memory data will be written. For parameters having their output select bit set, the parameter output select references the location within the automatic panel that is to receive the data. For input parameters, the parameter output select is meaningless and therefore ignored by the root memory.

(6) Auxiliary Table Pointer—The last two bytes of the data stamp house the Auxiliary Table Pointer. Depending on the type of parameter identified by the parameter signature, an auxiliary table table pointer referencing one of four auxiliary tables may be required. The following parameter types must be accompanied by a pointer to the auxiliary table specified:

| Parameter Type | Table |
| --- | --- |
| register (scaled data option) | auxiliary scale table |
| switch | auxiliary switchology table |
| sync | auxiliary sync table |
| memory | auxiliary address defintion table |

Each auxiliary table contains information that is unique to the parameter type. The structure of each table is discussed in separate sections of this specification.

Auxiliary Scale Tables

Auxiliary Scale tables are required for those parameter commands that select registers having the scaled data display option. The structure of a typical auxiliary scale table data stamp is depicted in FIG. 10. The scale table is comprised of a parameter scale factor, decimal placement, scale text vector, and parameter data type.

(1) Parameter Scale Factor—The parameter scale factor is a four byte integer that expresses the numerical weighting of the least significant bit of the register. The root memory multiplies this factor with the current value of the register to produce the scaled numerical data for display on the CRT terminal 12.

Assume, for example, that scaled data is to be displayed for the target range register and that the desired scale factor is to be 12.2946 ft/bit. The parameter scale factor, then, would be the numerical equivalent of this bit weight or 122946. Register data would thus be multiplied by 122946 to produce the numerical result that is to be displayed as scaled data.

(2) Decimal Placement—The decimal placement byte determines where the decimal point is to be inserted in the final numerical value calculated for the register. For the 12.2946 scale factor described above, four decimal places must be prescribed in addition to the scale factor of 122946.

(3) Scale Text Vector—The scale text vector is the address of the scale text phrase that is appended to the register's scaled data display. The scale text phrase is an ordered listing of user and/or root dictionary words that specifies the dimension and bit weighting for the register. One such scale text might appear as follows:

" . . . FT/BIT @ 12.2946 FT/BIT"

(4) Parameter Data Type—The parameter data type alerts the root memory as to what type of data is to be expected from the register. Three data types are supported by this maintenance port:
sign magnitude data
unsigned data
twos complement data
In sign magnitude data, the most significant bit identifies the sign of the data (1=negative, 0=positive) while the remaining bits express the absolute value or "magnitude" of the parameter. In unsigned data, all bits are treated as magnitude. And finally, register data may also be interpreted in the standard twos complement notation.

Auxiliary Switchology Table

Auxiliary Switchology Tables are required for any parameters that are identified as switches in the Parametric Definition Table. The typical switchology data stamp is comprised of a data mask and a data set definition. Refer to FIG. 11.

(1) Switch Data Mask—The switch data mask identifies which register bits are to be modified during switch command execution. Logic Zeros in the mask mark those bits that are set or cleared by the switch. Logic ones mask those bits that are unaffected by the switch.

(2) Data Set Definitions—The data set definition specifies the ON condition for the register bits involved in the switch. When the register is set to this condition, the function selected by the switch command is enabled.

Auxiliary Sync Table

Auxiliary sync tables are present for every parameter identified as a sync in the Parameter Definition Table. The structure of the sync table (FIG. 12) is similar to the switchology table described above. The typical sync table is comprised of a data mask, data on definition, and a data off definition.

(1) Sync Data Mask—The sync data mask identifies the register bits that are to be toggled during the generation of the control signal specified by the sync command. Logic zeroes indicate those register bits that will be altered by the command. Logic ones mask those bits that remain unaffected.

(2) Data On Definition—The Data ON definition specifies the states to which the register bits must be toggled to generate a logic high for the sync signal.

(3) Data Off definition—The data OFF definition specifies the states to which the register bits must be toggled to generate a logic low for the sync signal.

Auxililary Address Definition Tables

An Auxiliary Address Definition Table should accompany each parameter identified as memory in the Parametric Definition Table. Address definition tables are structured as shown in FIG. 13.

(1) Memory Address Port—The first two bytes in the definition table specify the address port to where all memory addresses as written.

(2) Memory High Address, Memory Low Address—The next four bytes specify the logical address range for the selected memory. Bytes 3 and 4 establish the low address limit (usually address 0) for the memory while bytes five and six establish the high limit.

(3) Address Bit Length—The seventh byte of the Address Definition Table is the address bit length and I/O specification for the memory. The lower five bytes specify the address bit length (up to 32 bits) for the memory. The upper two bits are the address I/O select bits that indicate whether the memory to be accessed is in the automatic panel or in the maintenance port. If both select bits are set, the memory resides in the automatic panel at the location specified by the memory address port. If both bits are cleared, the memory to be accessed is internal to the maintenance port and resides at the locations specified by the low and high address bytes. (This latter condition may be selected only if a command exists in the user memory to examine the contents of the maintenance port proms or rams. Such a command might be desirable during self test and debug cycles of the maintenance port itself).

(4) Address Sync Command Number—The eighth byte in the Address Definition Table is reserved for the address sync command. Memories in the automatic panel may require a sync signal to route the address data to the proper address circuitry. These memories are identified by a logic O9H in their parameter signature. (Refer to FIG. 8).

If an address sync is to be generated, a command number must be assigned to the sync and loaded into the address sync command number slot. A Parametric Definition data stamp and Auxiliary Sync Table describing the sync must also appear in user memory. Address sync command operation is discussed in detail in the Software Operation section of this specification.

Figure 14A:
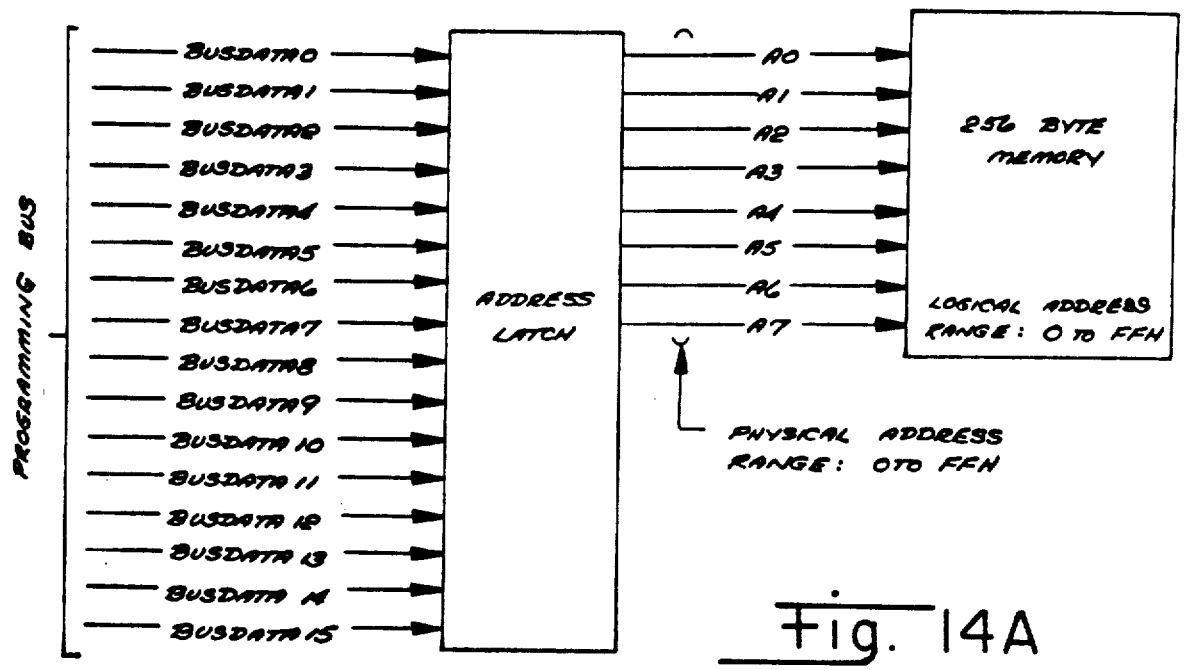
FIGS. 14A and 14B are diagrams showing alternative arrangements for the bus data address ranges.

(5) Address Shift—The last byte in the Address Definition Table specifies a left bit shift for the memory address. See FIG. 14A. Usually, memories are oriented such that their physical or hardwired address coincides with their logical (or programmed) address. For these memories, the address programmed by the maintenance port agrees with the logical address for the prom or ram.

Figure 14B:
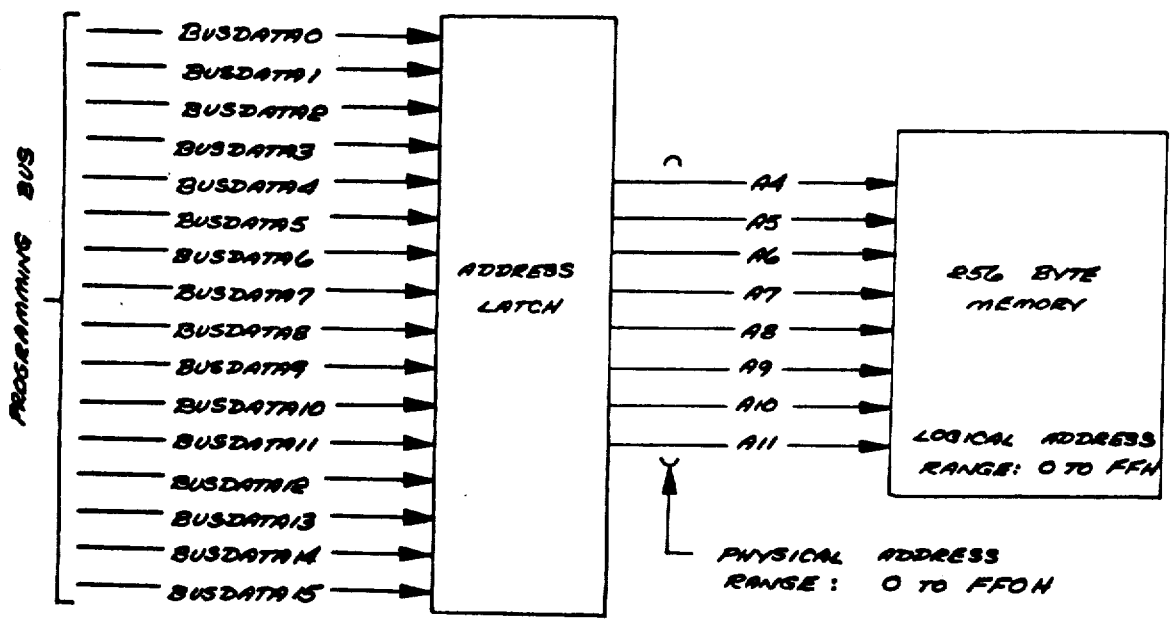

At other instances, however, memories might be distributed across the programming bus such that their physical addresses do not agree with their logical addresses. In FIG. 14B, for instance, the prom's logical address range is 0 through FF hexadecimal. To the prom's physical address range is 0 through FF0 hexadecimal. To compensate for discrepancies between the logical and physical addresses for a memory, an address shift must be specified.

Root Memory

The root memory of the maintenance port contains the coded modules and tables that determine how panel data is to be modified and displayed. The routines incorporated in the root standardize the formats used to view register and memory data. Since the display formats are independent of the parameter definitions incorporated in user memory, the operator is assured that parametric data will be presented in the same format regardless of the type of panel connected to the test set bus.

Figure 15:
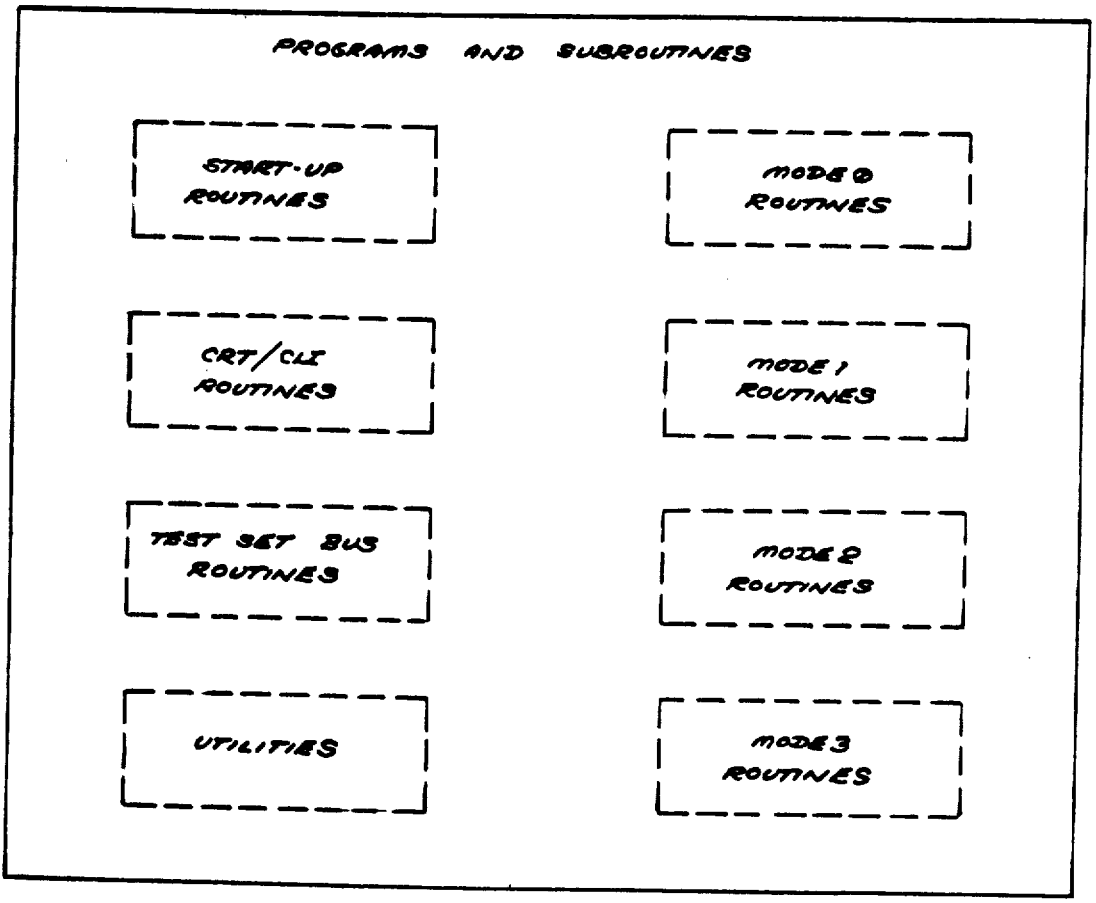
FIG. 15 is a block diagram showing how information is stored in the root memory.

FIG. 15 depicts the elements that comprise maintenance port root memory. They are:
Root Memory Text Tables
Root Memory Dictionary
Root Memory Text Templates
Programs and Subroutines
Each element is described in detail below.

Root Memory Text Tables:

Texts listed in the Root Memory Text Table are the comments and error messages that appear on the CRT of terminal 12 in response to commands keyed on the terminal. The structure of each root memory text is depicted in Table III of the Appendix. Messages are identified by the unique labels assigned to each text. Each text consists of an ordered string of root memory dictionary vectors that correspond to the message to be displayed. Each text is terminated by a "TXTEND" address delimiter to define the end of the message to the root memory.

Root Memory Dictionary:

Root memory texts listed in the Root Memory Text Table reference the addresses of words and phrases that are to be output to the CRT terminal 12. Each phrase or word referenced in a root memory text must appear in the root memory dictionary.

A sample of the root memory dictionary is depicted in Table VI of the Appendix (sheet 48). Each dictionary word is a collection or string of ASCII characters that is referenced by some preasigned label. Strings are terminated by an exclamation point "!". (Exclamation points are recognized by the root memory as the appropriate delimiter for any phrase listed in the dictionary.)

Root Memory Text Templates:

The Root Memory Text Templates are tables of phrases that express the form to which mode register bit definitions are displayed. A Root Memory Text Template is accessed whenever any command to display a mode register is received. A typical text template consists of a sequence of addresses to root memory. The sequence dictates the format to which each register bit definition (or "header") is displayed.

When a header is to be displayed, the mode text module for the register in question is executed. During execution, texts referenced from the root memory text template are interlaced on the terminal with texts from a user memory mode text table. The interlacing operation is discussed in the software operation section of this specification.

Programs and Subroutines:

The root memory of the maintenance port contains all of the executable code (i.e. programs and subroutines) necessary for maintenance port operation. The memory is divided into 142 modules of code with each module averaging 45 bytes in length. Refer to Table VII of the Appendix, sheet 50. Root memory modules fall into one of the following categories:
Start-up Routines
CRT/CLI Routines
Test Set Bus Routines
Mode0 Routines
Mode1 Routines
Mode2 Routines
Mode3 Routines
Utilities (1) Start-up Routines—Start-up Routines are executed by the maintenance port during power-up. When power is first applied; to the maintenance port, a reset strobe is applied to the 8085 microprocessor A26. The strobe forces the processor to begin program execution with the START module located at address 0000H. The START module, together with the PRTINT and BAUD modules, perform an initialization procedure for the maintenance port. Functions performed during initialization include:
clearing all maintenance port ram
resetting the stack pointer
initiating the 8253 timer/counter
initializing the 8251A usart
locking onto the CRT baud rate (2) CRT/CLI Routines—The CRT/CLI Routines form the Command Line Interpreter for the Maintenance Port. When any key is struck on the terminal's keyboard 28, a CRT interrupt is issued to the 8085 microprocessor. The processor acknowledges the CRT interrupt by invoking the CLI.

The function of the Command Line Interpreter is to accept and interrogate any character that is received from the keyboard of the CRT. Included among its duties are to:
input the character from the keyboard
test the character for validity
store valid characters in the command buffer
check the typed command against the valid command list
issue errors for invalid commands
place valid commands into execution
In addition to these duties, the CLI also performs the following maintenance port commands:
the HELP command
the "CTRL-C" console interrupt directive
the "CTRL-K" kill line directive
the "DEL" delete character prompt (3) Test Set Bus Routines—The Test Set Bus Routines listed in the table are the I/O driver modules that control the flow of data to and from the automatic panel. The "LDPAR" and "RDPAR" modules input data from a specified automatic panel register to a parameter data buffer located in maintenance port ram. Conversely, the "STPAR" and "WRPAR" modules route data from the parameter data buffer to the specified panel register.

Figure 16:
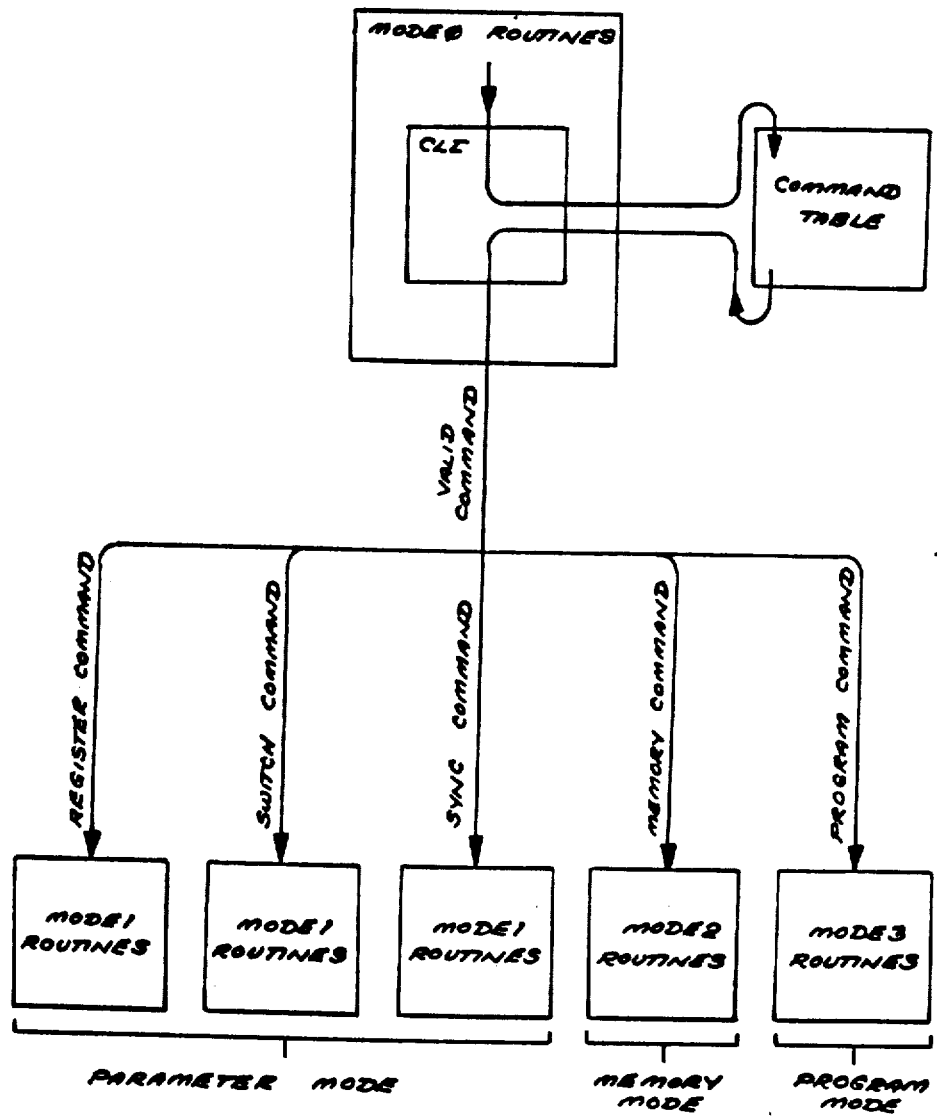
FIG. 16 is a diagram showing the mode0 (mode zero) link in memory.
Figure 17:
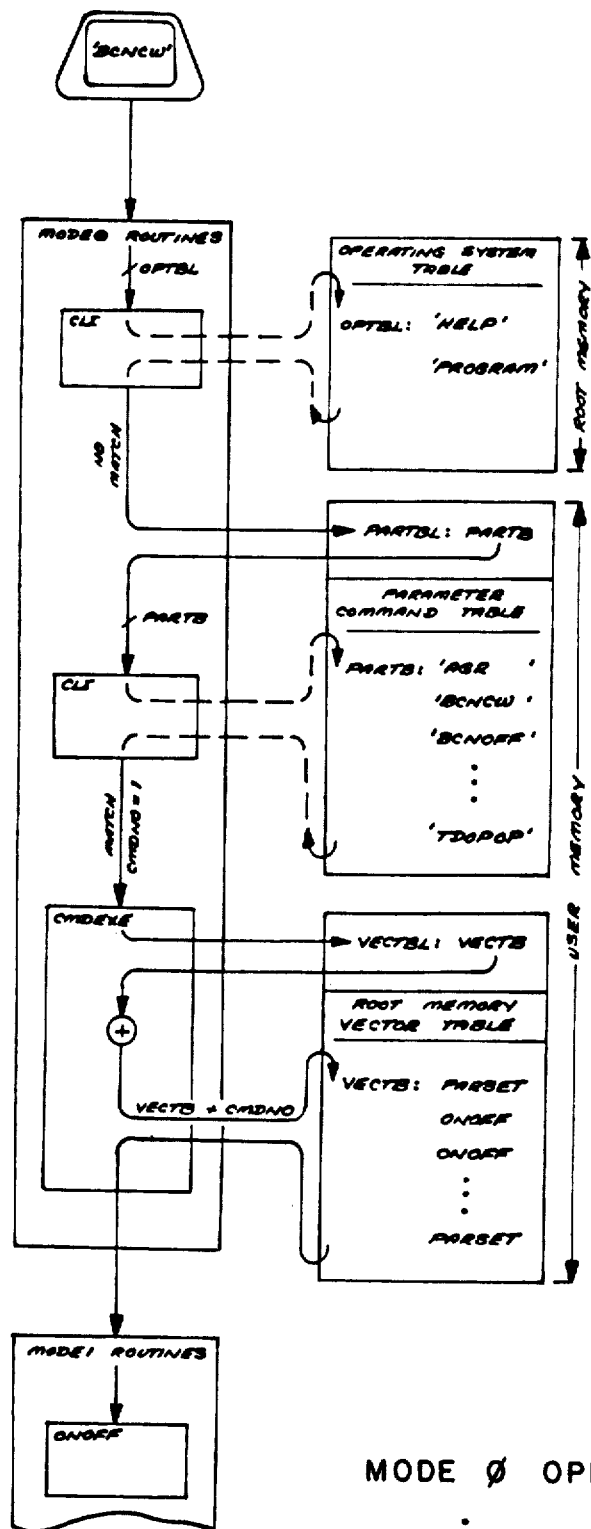
FIG. 17 is a flow chart showing mode0 operations.

(4) Mode0 Routines—The Mode0 routines function as the program link between the Command Line Interpreter (CLI) and the various operating modes of the maintenance port. Refer to FIG. 16. When a valid command is detected by the CLI, the mode0 modules configure the maintenance port into one of the following modes:

parameter mode
memory mode
program mode

The mode selected for the maintenance port depends on the type of command issued by the operator. If a register or switch command is keyed, the parameter mode modules block (MODE1) is selected. If memory is to be accessed, the memory mode modules block (MODE2) is addressed. And finally, when the PROGRAM command is issued, the program mode modules block (MODE3) is referenced.

(5) Mode1 Routines—The Mode1 Routines control the operation of the maintenance port whenever the parameter mode is activated. (The parameter mode allows the user to set software switches and to call up any register within the automatic panal.

Functions performed by the model modules include:
setting/clearing designated software switches
displaying header messages for mode registers
fetching and displaying register data
providing up to five formats—binary, octal, decimal, hexadecimal, scale—for viewing registers
providing a change data field for modifying registers (6) Mode2 Routines—The Mode2 Routines control the operation of the maintenance port whenever the memory mode is selected. (The memory mode allows the user to display data from any prom or ram memory within the automatic panel. Functions controlled by the mode2 routines include:
displaying memory address and data select information
displaying memory in a paged data format
executing the following memory mode commands:
    DISPLAY [start address] [stop address]
    >(page-up)
    <(page-down)

(7) Mode3 Routines—When the "PROGRAM" command is keyed from the terminal, the maintenance port is reconfigured to the program mode. (The program mode affords the more experienced user the opportunity to create and execute mini-scenarios for the automatic panel.) The Mode3 Routines control maintenance port operation when the program mode is selected.

Functions performed by the mode3 modules include:
Assembling the scenario program
Executing the scenario program
Providing support for the creation and execution of the following program mode commands:

| ASSIGN | [register] [value] |
| COMPARE | [register] [condition code] [value] |
| DISPLAY | [register] |
| JUMP | [instruction address] |
| LOOPCNTA | [instruction address] |
| LOOPCNTB | [instruction address] |
| SETCNTA | [value] |
| SETCNTB | [value] |
| SETSW | [switch] |
| STROBE | [sync] |
| TYPE | |
| WAIT | [no. of milliseconds] |

Displaying program error messages (8) Utilities—Twenty-nine general purpose utility modules are incorporated in the root memory. These modules perform standard number crunching and byte manipulation operations for the port. Table VIII of the Appendix highlights the function assigned to each utility.

SOFTWARE OPERATION

Commands for displaying and modifying automatic panel registers are communicated to the maintenance port via the CRT terminal 12. This section describes the interaction between the root memory and the user memory for command type issued.

Initialization:

When power is first applied to the maintenance port system, all rams associated with the port are cleared. The stack pointer is then initialized to the topmost location in ram—address 3FFF hexadecimal.

Once software initialization is complete, hardware initialization commences. The 8253 timer-counter chip E26 (FIG. 2D) is preset by the BAUD module to provide a 1200 Hz baud rate to the 8251A usart G47. The usart is also configured by the port to transmit and receive ASCII data with the following attributes:
1 stop bit
parity disabled
8-bit ASCII To complete hardware initialization, the operator must strike the "RETURN" key several times. For every two "RETURN" keystrokes, an ASCII character is read from the receiver buffer of the 8251A device G47. The BAUD routine reads the received character and determines whether the character is an ASCII "RETURN" (OD hexadecimal). If the character is not valid, the BAUD routine doubles the frequency output of the timer-counter and waits for two more keystrokes. This procedure cycles repeatedly thru each of four baud rates:
1200 Hz
2400 Hz
4800 Hz
9600 Hz
until the maintenance port baud rate is locked to the terminal's.

When the received character is a valid "RETURN", the port is considered locked to the CRT. The operator is informed of his success through an initialization message that appears on the screen. The message informs the operator that the maintenance port has been activated and lists the valid parameter commands from the Parameter Command Table residing in user memory.

CLI Operation:

After initialization, commands to display and modify panel parameters may be issued from the keyboard. Command characters are entered, as they are typed, into a 28 byte command buffer (labeled BUFFER) residing in maintenance port ram. Each character is examined by the Command Line Interpreter for validity before it is stored. Characters deemed unacceptable by the CLI are not echoed on the CRT; a warning beep is issued instead.

If the character is deemed acceptable, the CLI performs one of the following activities depending on the character type:

(1) If the character is a control directive, the CLI immediately performs the function commanded by the directive. For the commands listed below, the CLI performs the indicated operation.

| Control Directive | Function |
|---|---|
| CTRL-K | erase the current command line |
| CTRL-C | interrupt the maintenance port |
| CTRL-A | abort execution of a program |
| CTRL-S | pause execution of a program |
| CTRL-Q | continue execution of a program |
| CTRL-\ | tab the program line |

After the directive is executed, the command buffer is cleared and re-initialized to accept a new command string from the keyboard.

(2) If the character is an aliphanumeric, it is stored into the command buffer by the CLI module routine "STRCHR".

(3) If the "DELETE" character is received, the "DELCHR" module is invoked. The "DELCHR" module erases the last character keyed into the command line by the operator and readjusts the BUFFER pointer appropriately.

(4) Finally, when a "RETURN" or "ENTER" keystroke is detected, the CLI begins processing the command. The ASCII string residing in the command buffer is compared to all commands acceptable for the current operating mode of the port. This comparison is accomplished by the Command Line Interpreter's "CMDSCH" module. The "CMDSCH" module scans an alphanumerically sorted table of valid commands searching for a unique match to the typed command. If no such match is found, an invalid command error is issued to the terminal. The buffer is once again cleared, and a new prompt is displayed.

If, however, a unique match is discovered, the CLI reports a command number associated with the placement of the command in the table just scanned. The command number CMDND is delivered to the proper root memory mode modules (MODE0, MODE1, etc.) for further processing.

Parameter Mode Operation:

The parameter mode is designated whenever a register or switch command is to be executed. The link between the Command Line Interpreter and the parameter mode (MODE1) modules is accomplished via the MODE0 routines.

The MODE0 LINK

FIG. 17

When the maintenance port is idling, a parameter mode prompt (".") appears on the screen. This prompt indicates that the port has defaulted to the parameter mode and is ready to accept any of any following command types:
register
switches
memories
controls During this idling period, the root memory's MODE0 routines are active. As each command character is typed, an interrupt is generated to the maintenance port's 8085 processor A26. Program control is then vectored to the MODE0 routine. The MODE0 routine inputs the character from the 8251A usart G47 and calls upon the GLI to examine the ASCII character. In the manner described in the previous secton, the CLI stores each character as it is typed until a carriage return is encountered.

Upon reception of a carriage return, the MODE0 routine fetches the vector to the operating system command table residing in root memory. Armed with this vector, the MODE0 routine calls upon the CLI to compare the commands listed in the operating system command table. To date, only two operating system commands appear in the table:
HELP
PROGRAM If the HELP command was keyed, the CLI is commanded to display information concerning the current operating mode of the maintenance port. If the PROGRAM command was issued, control is passed to the MODE3 modules in root memory. These modules configure the port to the program mode.

If no match can be found among the operating system commands, the CLI reports its finding to the MODE0 routine. The MODE0 routine then fetches the vector to the Parameter Command Table residing in user memory. (This vector resides in a special address location labeled "PARTBL" and must reside somewhere in user memory.) Armed with this new vector, the MODE0 routine again requests that the CLI perform a command search. If a match is found between the keyed command and those commands listed in the user memory's Parameter Command Table, the CLI develops a command number CMDNO. The number is then delivered by the CLI informing the MODE0 routine of the placement of the command within the Parameter Command Table. Note that, at this time, the command type—register, switch, etc.—is still unknown.

To complete the link to the other mode routines, the command execute module "CMDEXE" is invoked. While in the "CMDEXE" module, the command number developed by the CLI is used to create a vector to the Root Memory Program Vector Table located in user memory. To create the vector, the "CMDEXE" module fetches the vector table's starting address that resides in a special user memory location entitled "VECTBL". From that starting address, the module indexes to the root memory vector associated with the keyed parameter.

Once the root memory vector has been fetched from the Root Memory Program Vector Table, the "CMDEXE" routine passes control over to the specified module. As control is diverted to the specified module, program execution is assumed by one of the other mode routine blocks listed in Table IV of the Appendix.

| specified module | mode | block |
|---|---|---|
| PARSET | parameter mode, register | MODE1 |
| ONOFF | parameter mode, switch or sync | MODE1 |
| MMORY | memory mode, prom or ram | MODE2 |
| non-standard | parameter mode, mode register | MODE1 |

PARAMETER MODE: NON-MODE REGISTERS

Register commands are divided into two categories: mode and non-mode. Mode registers are identified by a header that appears at the top of the CRT display. Non-mode registers have no header.

When a non-mode register is keyed from the terminal, the "PARSET" module is part of the MODE1 modules block that configures and controls the operation of the maintenance port for the parameter mode. (Refer to Table VII of the Appendix.)

Figure 18:
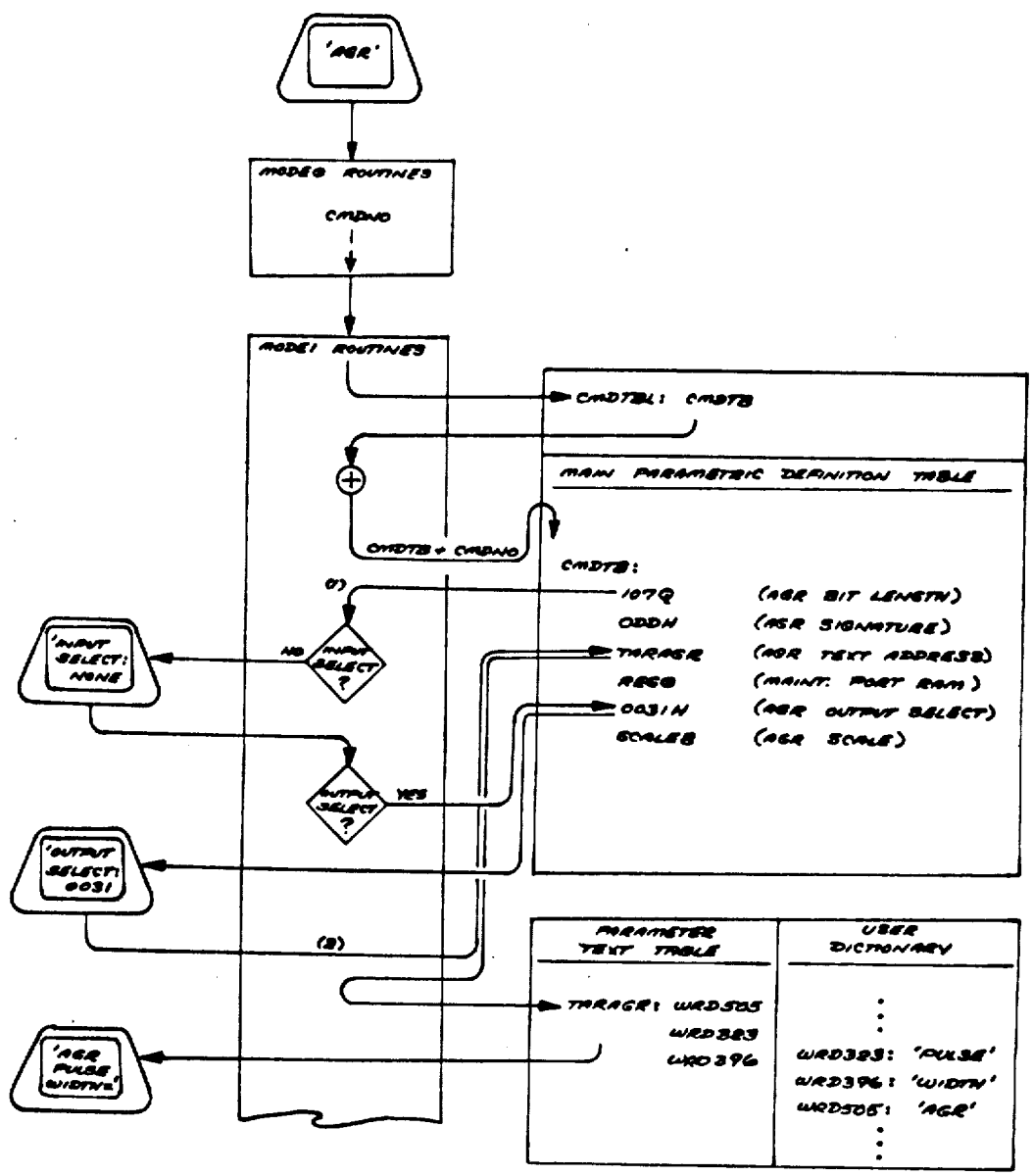
FIGS. 18 and 18A comprise a flow chart showing mode1 (mode one) operation, register display generation.
Figure 18A:
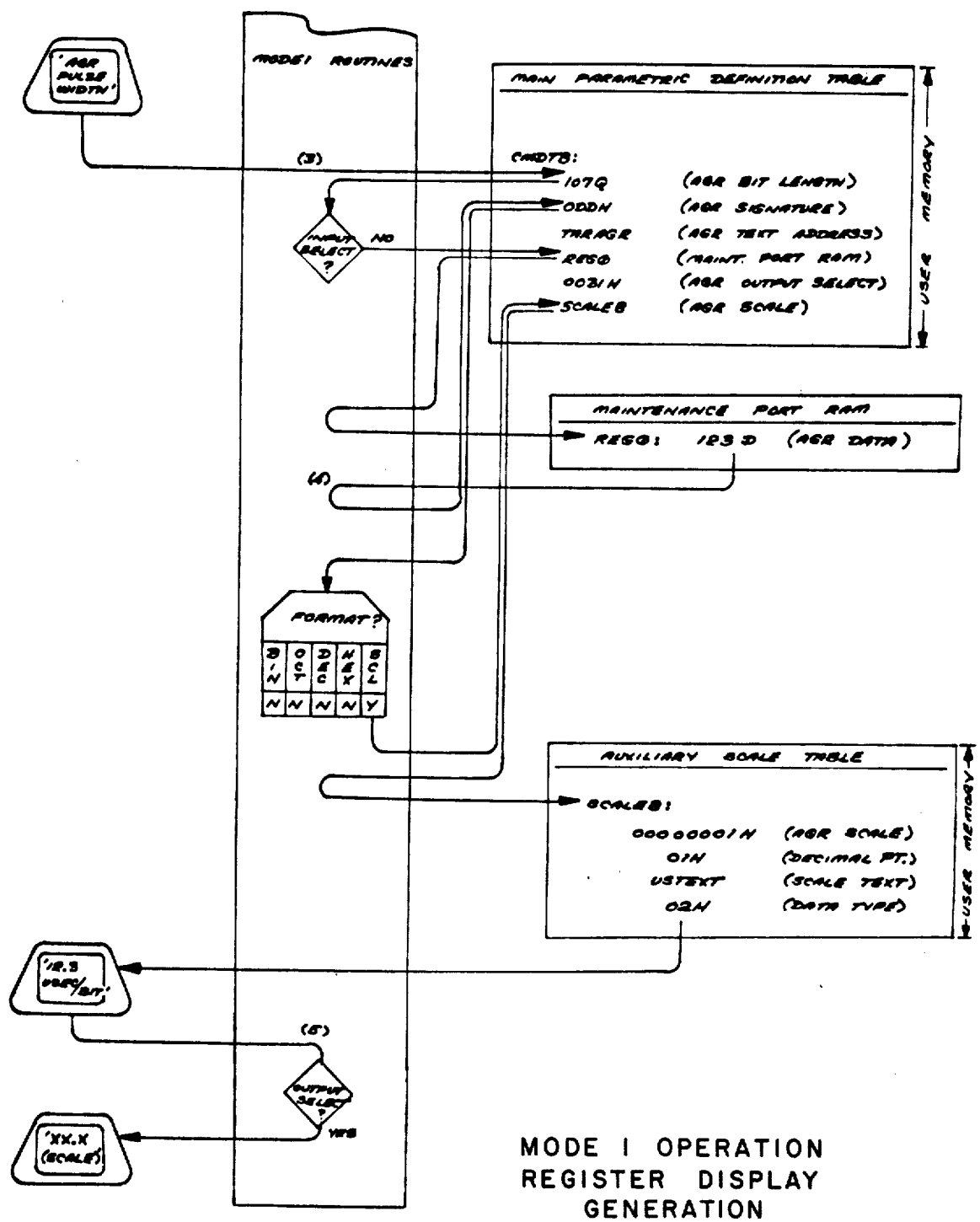

To access the non-mode register, information concerning the register must be communicated to root memory. The registration information is available in the Main Parametric Definition Table residing in user memory. The first operation performed by the "PARSET" routine, then, is to fetch the parametric definition. Refer to FIGS. 18 and 18A. Access to the register's parametric definition begins with the creation of a vector to the section of the Main Parametric Definition Table assigned for the command. The vector is formed from the command number delivered by the CLI and from the table's starting address residing in user memory prom location "CMDTBL".

The parametric definition of the register is then downloaded into parameter holding registers "PARHLD" located in maintenance port ram. It is from these registers that the root memory develops the display. (A typical register display is depicted in FIG. 19.)

(1) The first elements developed for the display are the input and output select messages. The select messages are created from the I/O select bits and the input-/output select addresses provided by the parametric definition. The I/O select bits are retrieved from the parameter bit length specification (byte 1) of the definition and examined. If the input select bit is set, the input select address is read from bytes 5 and 6 of the "PARHLD" registers and displayed. Similarly, if the output select bit is set, the output select address supplied in bytes 7 and 8 is displayed. When either I/O select bit is cleared, however, the root memory displays the word "NONE" on the terminal in place of the addresses specified by "PARHLD".

(2) The next element displayed on the screen is the parameter label assigned to the register. The parameter label is created from the text address vector stored in bytes 3 and 4 of the "PARHLD" registers. The text address vector points to an ordered listing of addresses to the root and users memory dictionaries. To display the label, then, the display text utility "DISTXT" is invoked. The display text utility reads each dictionary word address in the listing, fetches the referenced dictionary word, and outputs it to the CRT terminal 12.

(3) After the register's name is completely displayed, the root memory appends an equal sign to the label. The register data may now be fetched. To fetch the data, the maintenance port examines the input select bit to determine where the register data originates. When the input select bit is set, the root memory invokes an input data cycle that reads data from a register located in the automatic panel. During the first half of the input data cycle, the parameter select address specified in bytes 5 and 6 of the "PARHLD" registers is output to the panel. During the second half of the cycle, the requested data is received from the panel.

When the input select bit is zeroed, the root memory fetches data from the maintenance port ram location having the address specified by "PARHLD" register bytes 5 and 6.

(4) Once the data is fetched from the specified location, the MODE1 modules determine how the data is to be displayed. From the parameter signature for the register, the default number is examined by the modules. The default number dictates to the root memory the format in which the selected register is to be displayed. The numbers are interpreted as shown in the chart below:

| Default Number | Format |
| --- | --- |
| 1 | binary data |
| 2 | octal data |
| 3 | decimal data |
| 4 | hexadecimal data |
| 5 | scaled data |

If binary, octal, decimal, or hexadecimal formats are chosen, register data is displayed scaled to the selected base.

If, however, the scaled data format is defaulted to, register data is weighted by a scale factor referenced in the auxiliary scale table assigned to the register. This scaling process is accomplished as follows. When it is desired to display a register in its scaled format, the MODE1 modules input the scale table vector residing in bytes 9 and 10 of the parameter holding registers. With the scale table vector, the root memory first determines the type of data it has received from the automatic panel. The parameter data type is communicated to the root through byte 8 of the referenced scale table. Once the type is known, the root memory reads the scale factor and decimal placement bytes and develops the appropriate numerical display for the register data. Finally, after printing the numerical result, the MODE1 modules retrieves the scale text vector from bytes 6 and 7 of the scale table and appends the appropriate scaling units to the display.

(5) At this point in the development of the display, one of two activities is initiated depending on whether or not the register's output select bit is set. If the register's select bit is set, a change data field consisting of an appropriate number of "X"es is created for the display. The change data field provides the operator the opportunity to modify the register data as desired. To the right of the change field is appended the format to which the register data has been scaled. If, however, the register's output select bit is cleared, no change data field is created and only the format name appears on the terminal.

PARAMETER MODE: MODE REGISTERS

Figure 21:
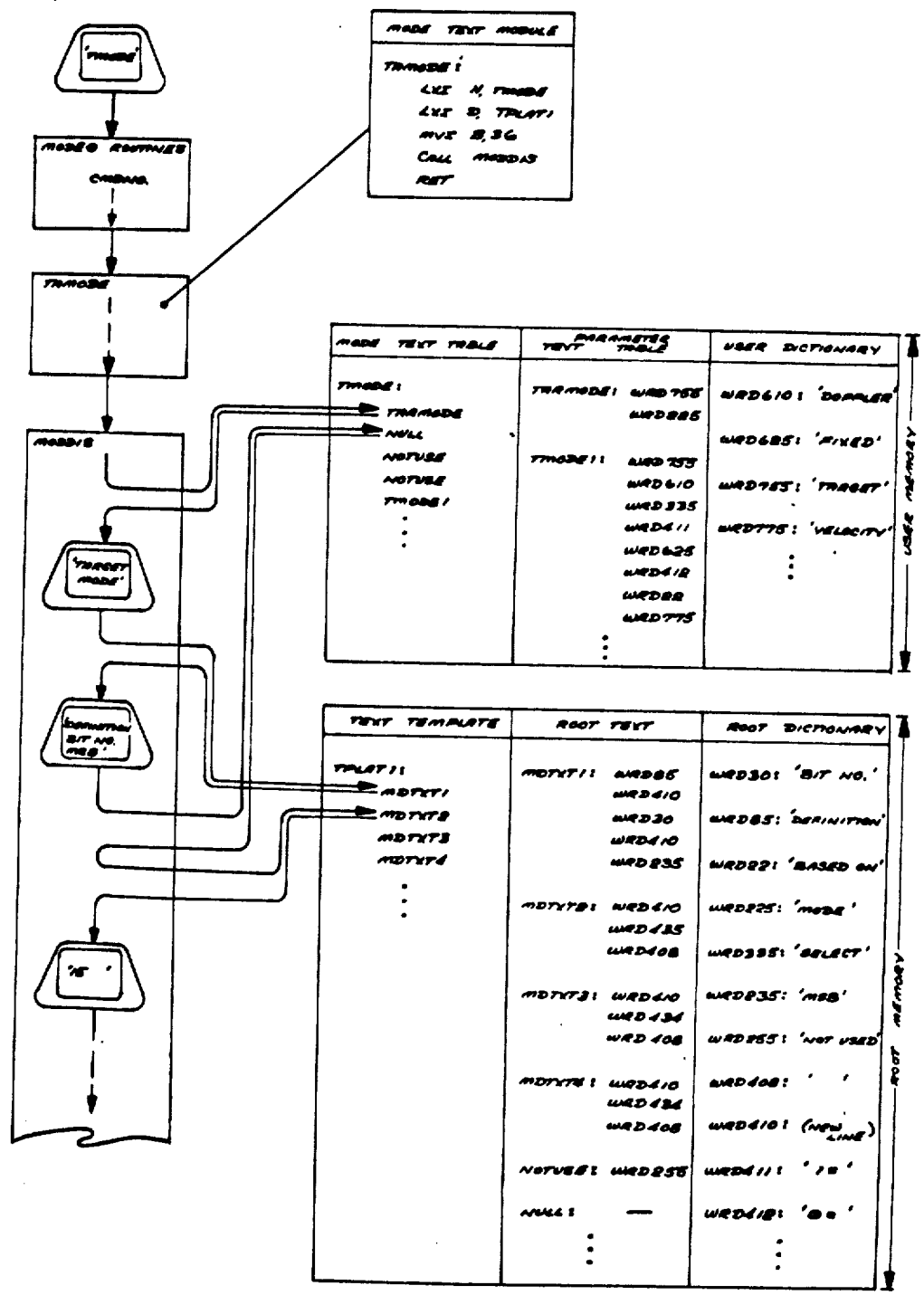
FIG. 21 is a flow chart for register header generation.

Mode registers are identified by a header that appears at the top of the CRT display. When a mode register command is keyed from the terminal, a mode text module residing in user memory is invoked. FIGS. 20 and 21 should be referenced for the following discussion.

When the mode text module is executed, two vectors are passed to the root memory header display module "MODDIS". The first vector references a root memory header text templates that dictates the "form" of the header display. The second references the mode text table in user memory that is used to "complete" the form. Once these two vectors are received, the "MODDIS" module pieces together the display. Phrases are displayed in interlacing fashion from text addresses supplied from the text template and the mode text table. The first phrase is referenced from the text table; the second from the template; the third from the text table; and so on until the entire header message created.

Once the header is created, mode register data is fetched and displayed in the same manner as its non-mode counterpart.

PARAMETER MODE: MODIFYING THE DISPLAY

Displays for mode and non-mode registers may be modified. Basically, two items on the display may be modified: the format in which the register is viewed, and the register data value itself.

(1) Modifying Register Format—The data format field of the display allows the operator to modify the the base to which the register data is scaled. To modify the base, the operator must first tab the cursor into the data format field. Once this is accomplished, a subsequent keystroke commands up a new format for the register.

New formats are generated for the register display as described below. If a keystroke is detected when the cursor is in the data format field, the root memory fetches the parameter signature from byte two of the "PARHLD" registers. The root memory then increments the default number specified in the signature and examines the data format switch bit corresponding to the new default value. The data format switches are related to the default values as shown in the following table:

| Default Number | Format Switch Field Bit |
|---|---|
| 1 | 7 (binary) |
| 2 | 6 (octal) |
| 3 | 5 (decimal) |
| 4 | 4 (hexadecimal) |
| 5 | 3 (scaled) |

If the format switch referenced by the default value is set, register data is re-displayed in the new format, and the parameter signature is revised to reflect the new default number. If, however, the format switch is cleared, the default number is again incremented and the next format switch bit listed in the table is examined:

When the incremental value reaches six, the root memory clears the default number and issues the "ABORT" option to the display. The "ABORT" option allows the operator to exit the display without modifying the contents of the selected register.

(2) Modifying Register Contents—For registers having output selects, the root memory creates and displays a change data field. The change data field consists of a row of "X"es with each "X" corresponding to a digit or register data. When register data is to be modified, the operator tabs the cursor to the digit(s) in the change data field that are to be altered. The new data value is then entered via the keyboard.

As each new digit is typed, the MODE1 modules compare the keyed value to acceptable values for the displayed format. The MODE1 modules also examine the value to insure that its placement among the remaining change field digits does not cause register overflow. If both requirements are satisfied, the digit is echoed in the change data field. Otherwise, the MODE1 modules issue a warning "beep" to inform the operator that the digit is unacceptable.

When a "RETURN" or "ENTER" keystroke is detected, the register is loaded with the data word that appears in the change data field. To download new information into the register, the root memory generates an output data cycle. Prior to initiating the cycle, the output select address is read from bytes 7 and 8 of the "PARHLD" registers. This address is placed onto the test set bus during the first half of the output data cycle and designates the panel register that is to receive the data. The selected panel register is then updated with the change field data value at the conclusion of the cycle.

Now, if the input select bit for the register is set, the updating sequence terminates at the end of the output data cycle. If, however, the register's input select bit is not set, the root memory loads the change field data into the maintenance port ram location specified by bytes 5 and 6 of the "PARHLD" registers. By doing this, the root memory maintains "track" with any updated information sent to the panel register.

PARAMETER MODE: SWITCHES

(FIG. 22)

When a switch command is keyed from the terminal, the "ONOFF" module in root memory is placed into execution. The "ONOFF" module is one of three modules—ONOFF, SWITCH, MODSW—that enable the operator to set or clear a predefined software switch in the automatic panel. A software switch is defined to be any parameter command that directly modifies all register bits that select or deselect a particular panel function.

To control the switch, information describing the switch must first be relayed to the maintenance port. Switch information is available from the Main Parametric Definition Table residing in user memory. To access the table, a vector is formed from the command number supplied by the CLI and from the starting address of the table residing at user prom location "CMDTBL".

The switch definition is then downloaded into parameter holding registers "PARHLD" located in maintenance port ram. Note that at this time, it is not known whether the command entered by the operator was a switch or a sync. To resolve the command type, the parameter signature located in byte 2 of the "PARHLD" registers is fetched and examined. If the signature is a 06 hexadecimal, a switch command is indicated.

Figure 22:
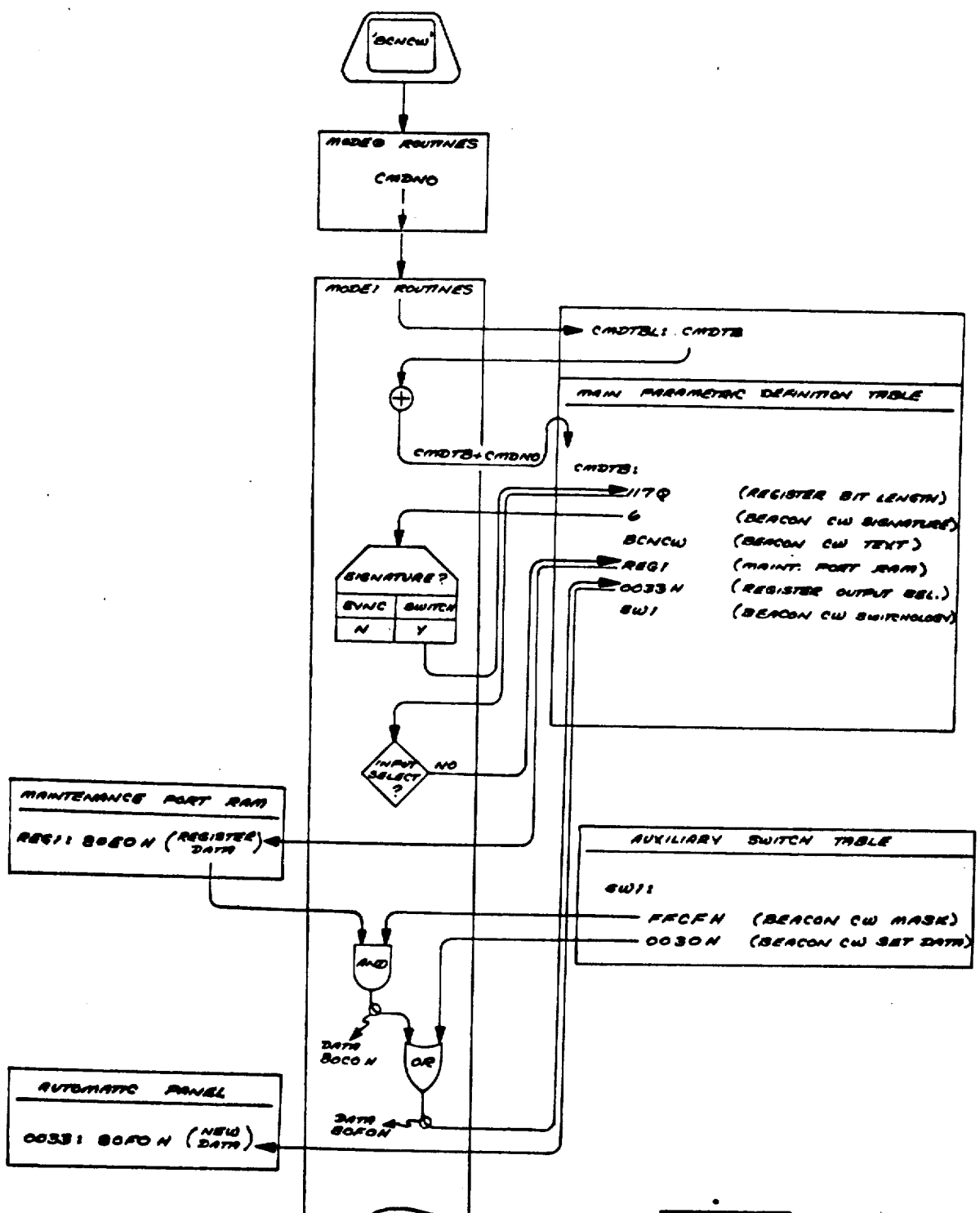
FIG. 22 is a flow chart showing mode1 operation, setting a switch.

The maintenance port then sets the switch as outlined in FIG. 22.

(1) From the switch definition bytes 9 and 10, a vector to the Auxiliary Switchology Table is formed. The corresponding switchology information is then stored in the "PARSCL" holding registers in maintenance port ram. (The switchology information dictates to root memory which bits of the specified register are affected by the switch and specifies to what values these bits are set.).

(2) After fetching the table, the root memory inputs the current data value for the register to be modified by the switch. To input the data, the root memory reads information from the register addressed by the input select code specified in bytes 5 and 6 of the "PARHLD" registers.

(3) Once the register data is available, the root memory ANDs the data with the data mask fetched from bytes 1 and 2 of the switchology table. This masking operation clears those register bits that are to participate in "setting" the switch.

(4) After the masking process, the revised data word is ORed with the data-on definition found in bytes 3 and 4 of the switchology table. The OR operation is required to set the remaining bits in the register that effect the switch.

(5) The root memory then outputs the new register data word to the panel address specified by the output select code (bytes 7 and 8) the switch definition. After outputting the new value, the switch message referenced by switch definition bytes 3 and 4 is displayed on the terminal and a new parameter mode prompt, "." is issued.

PARAMETER MODE: SYNCS

(FIG. 23)

When a sync command is keyed from the terminal, the "ONOFF" module in root memory is placed into execution. The "ONOFF" module is one of three modules—ONOFF, SYNC, MODSW—that enable the operator to create a sync signal for the automatic panel. A sync is created by toggling one or more register bits from one known state to another.

To generate the sync, information describing the sync must be conveyed to the maintenance port. This information is available from the Main Parametric Definition Table residing in user memory. To access the definition table, the root memory produces a vector from the command number supplied by the CLI and from the starting table address CMDTBL located in user memory.

The sync definition is then copied into parameter holding registers "PARHLD" in maintenance port ram. Note that at this time, it is not known whether the command entered by the operator was a sync or a switch. To resolve the command type, the parameter signature located in byte 2 of the "PARHLD" registers is fetched and examined. If the signature is a 07 hexadecimal, a sync command is indicated.

Figure 23:
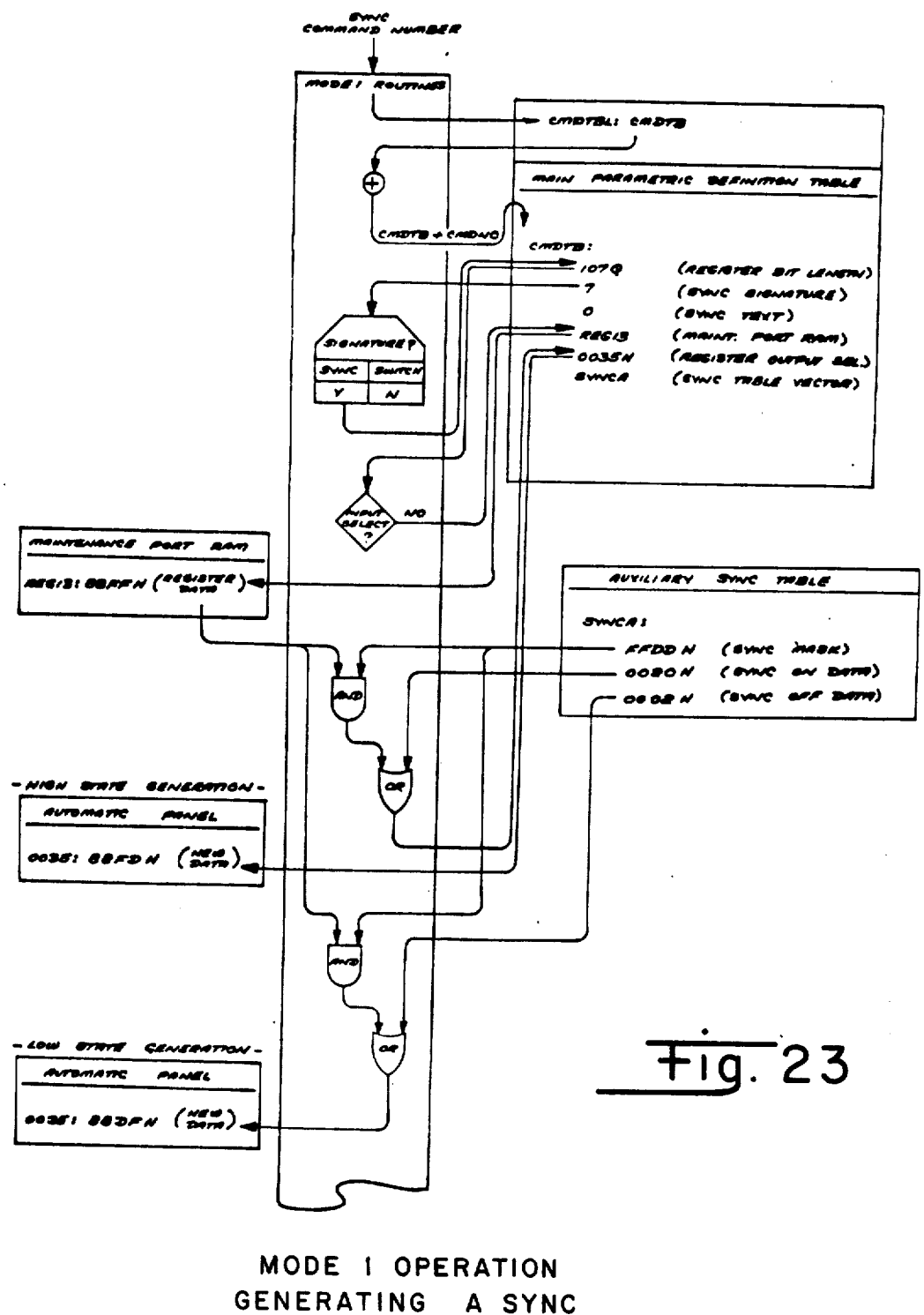
FIG. 23 is a flow chart showing mode1 operation, generating a sync.

The maintenance port generates a sync as outlined in FIG. 23.

(1) From the sync definition bytes 9 and 10, a vector to the Auxiliary Sync Table is formed. The corresponding sync data is then written into the "PARSCL" register located in maintenance port ram. (The sync table is a data stamp that dictates to what states the register bits must be set during sync generation.

(2) Once the table is fetched, the root memory inputs the present status of the register to be modified. The register accessed by the root resides at the panel address specified by bytes 5 and 6 of the "PARHLD" registers.

(3) After the data is read, the root memory ANDs the data with the data mask supplied in bytes 1 and 2 of the sync table. The masking operation clears the register bits that participate in the creating the sync.

(4) The masked data is then ORed with the "data-on" definition listed in bytes 3 and 4 of the sync table. This OR operation sets the register bits that effectively generate the "high" state for the sync.

(5) Once the data-one or "high" state condition has been established, the root memory outputs the condition to the register addressed by the output select code (bytes 7 and 8) specified. By outputting this new value, it is assumed that a control signal in the panel will be set high.

(6) To clear the control signal and thereby complete sync generation, a procedure similar to steps 2 thru 5 is performed. The major difference in the procedure is the substitution of the "data-off" definition during the ORing operation. The "data-off" definition identifies the states the register bits must occupy to complete sync generation.

THE MEMORY MODE

When any command to view memory is keyed from the terminal, the "MMORY" module is placed into execution. The "MMORY" module is part of the MODE2 modules block of table VII of the Appendix that configures the maintenance port for memory mode operation.

When the memory mode command is issued, the parametric definition for the selected memory is copied from the Main Parametric Definition Table. Bytes 9 and 10 of the parametric definition are then assembled to form a vector to the Auxiliary Address Definition Table. With this vector, the address definition is also downloaded into maintenance port ram.

Memory display generation may now take place. A typical memory mode display is depicted in FIG. 24. With the information provided by the address and parametric definitions, the MODE2 modules create the address select, input and output data selects, and the address range messages for the display. The address select code is provided in bytes 1 and 2 in the Address Definition Table and specifies the panel register that will latch the memory address. The address range message echoes the low and high address limits that appear in bytes 3 thru 6 at the same table. And finally, the input and output select codes are derived from bytes 5 through 8 of the parametric definition.

After the preliminary messages are displayed, a memory mode prompt "*" is issued on the screen. While the asterisk is present, the root memory interprets any command keyed by the operator as a memory mode command.

Figure 25:
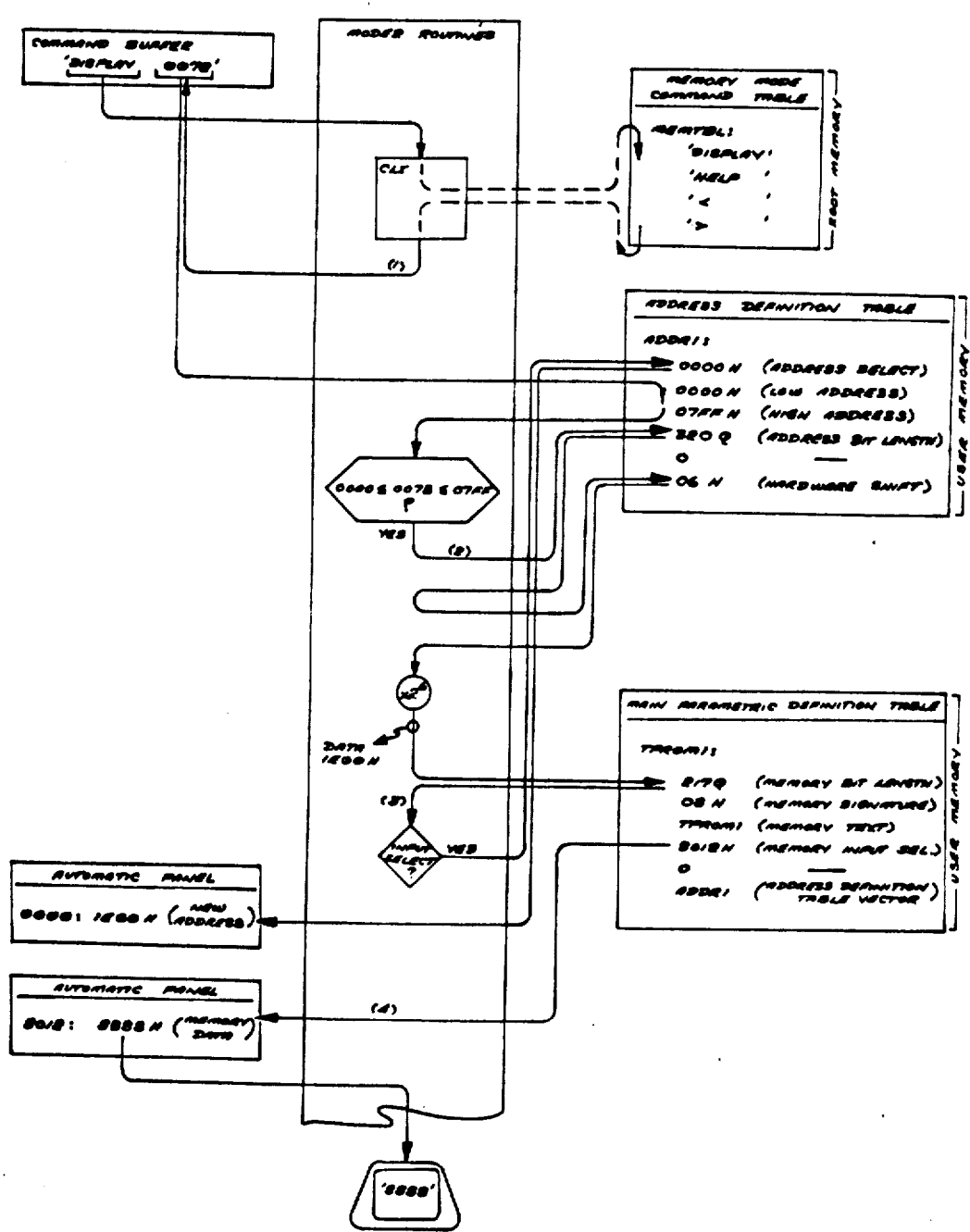
FIG. 25 shows a memory mode display example.

Basically, this version of the maintenance port provides for three memory mode commands—DISPLAY, >, and <. When a command is issued to DISPLAY memory, the following activities, depicted in FIG. 25, are performed by the MODE2 routines:

(1) The logical address(es) appended to the "DISPLAY" command are compared by the MODE2 modules to the address limits specified in the memory's address definition table. If any address is invalid, the appropriate mismatch or over-range error message is issued to the CRT.

(2) Once address validation is complete, the panel memory may now be accessed. The MODE2 modules begin memory access by creating the physical address that will be sent to the memory. To create a physical address, the MODE2 modules require three bytes of information:

Parameter Bit Length and I/O Switches
Address Bit Length
Hardware Shift

From the address bit length definition, the root memory determines the length of the memory's logical address. Armed with this information, the root generates a corresponding physical address by left-shifting the logical address the number of places specified in the Hardware Shift byte.

Once the physical address is formed, the MODE2 modules determine whether the address is to be sent to a panel memory or a memory internal to the maintenance port. This determination is made by examining the state of the input switch for the memory. If the input select switch is set, the physical address is sent to the panel register that resides at the select code specified in bytes 1 and 2 of the address definition table. If the switch is cleared, the physical address is treated as a direct address to some ram or prom chip that is part of the maintenance port system.

(3) Once the address has been sent to panel, an input data cycle is initiated. During the first half of the input data cycle, the input select code referenced by bytes 5 and 6 of the parametric definition is placed on the test set bus. Memory data is then read from the panel at the conclusion of the cycle.

(4) The maintenance port scales each memory data word as it is received from the panel and displays it in hexadecimal format. After the word is displayed, the maintenance port increments the panel memory address and re-executes the procedure outlined above.

Memory data is displayed in paged format on the CRT terminal 12. Each page consists of sixteen lines of data words with each line consisting of a fixed number of data words. The number of words per line depends on the size of the memory data word itself. For the following data sizes, the root memory has assigned this number to be:

| Memory Data Size | No. Words/Row |
|---|---|
| 1 to 8 bits | 16 |
| 9 to 16 bits | 8 |
| 17 to 32 bits | 4 |

With each row displayed on the screen, the root memory also displays the address of the first data word displayed in each row. A typical display of a page of memory data is depicted in figure on sheet 78 of the appendix 26. Note that the address specified for each row is the LOGICAL address, not the PHYSICAL.

Commands to page memory up (">") or down ("<") are treated in a slightly different manner than the command to "DISPLAY" memory. The "DISPLAY" command allows the operator to specify address limits for viewing memory. For the paging commands, however, address limits are calculated by the maintenance port transparent to the operator.

When a page-up (">") or page-down ("<") memory mode command is issued, the following activities are performed by the MODE2 modules:

(1) Whenever a page-up command is keyed, the memory address above the last address displayed on the CRT terminal 12 is examined by the MODE2 routines. If this address is within the range established by bytes 3 thru 6 of the address definition table, the next higher page of memory is output to the screen. If, however, the new address is not within the specified range, an out-of-range error message is generated.

(2) Whenever a page-down command is entered, the memory address below the first listed on the CRT is examined. If this address is within the range specified by bytes 3 thru 6 of the address definition table, the next lower page of memory is displayed. Otherwise, an appropriate error message is issued by the maintenance port.

THE PROGRAM MODE

The Program Mode is initiated when the "PROGRAM" command is keyed from the terminal. The program mode affords the more experienced user the opportunity to create mini-scenarios for the automatic panel. While in the program mode, the maintenance port executes routines from the MODE3 modules block of Table VII in the Appendix.

When the "PROGRAM" command is first keyed, two scratchpad areas of ram are erased:
program instruction area
macro-instruction code area
The program instruction area of maintenance port ram buffers each program line created for the mini-scenario. The macro-instruction area stores the executable code that corresponds to each program instruction line keyed by the operator. After these areas are cleared, the maintenance port issues the program mode prompt "/" and line number "00" to the CRT.

Figure 26:
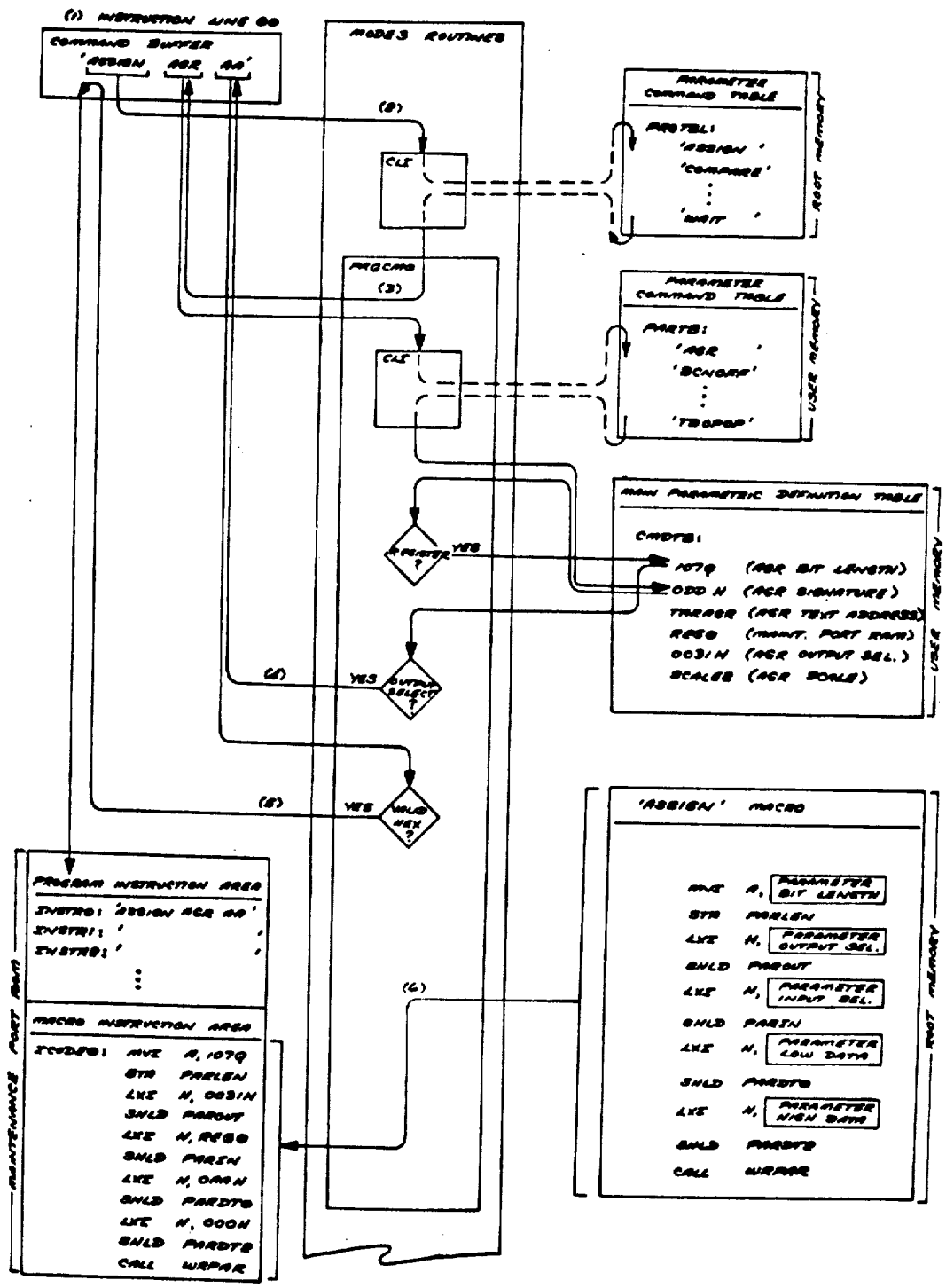
FIG. 26 is a flow chart showing mode3 operation.

The operator may now key in his program. Programs (or "mini-scenarios") are entered from the terminal. To describe the activity that takes place in the development of a program, assume that the statement
"ASSIGN AGR AA"
has been keyed into instruction line 00. Refer to FIG. 26.

(1) As each character of the first instruction is entered, it is stored by the CLI into the command buffer (BUFFER) located in maintenance port ram. After the carriage return terminating the instruction is received, the MODE3 modules examine the contents of the BUFFER.

(2) The MODE3 modules begin processing the instruction by examining the contents of the first field in the program line. The contents of this field are compared to valid program mode commands listed in the Program Command Table "PRGTBL" located in root memory. When a match is detected, a special MODE3 module located in root memory is placed into execution. The function of the special module is to interpret the remaining instruction fields according to the structure assigned for the program command selected in the match. For the program commands listed below, the following special MODE3 modules are executed in the event of a detection:

| Program Command | MODE3 Module |
|---|---|
| ASSIGN | PRGCM0 |
| COMPARE | PRGCM1 |
| DISPLAY | PRGCM2 |
| JUMP | PRGCM3 |
| LOOPCNTA | PRGCM4 |
| LOOPCNTB | PRGCM5 |
| RUN | PRGCM6 |
| SETCNTA | PRGCM7 |
| SETCNTB | PRGCM8 |
| SETSW | PRGCM9 |
| STOP | PRGCM10 |
| STROBE | PRGCM11 |
| WAIT | PRGCM12 |

(3) For the "ASSIGN" command, the "PRGCMO" module is placed into execution. The "PRGCMO" module continues interrogating the instruction line by inputting the second field listed in the BUFFER. Because the "PRGCMO" module is attached to the "ASSIGN" command, it expects to see a valid register command listed in the second field of the instruction. To verify that the register is valid, the module references the Parameter Command Table located in user memory. Now, to qualify as a valid register for the assign, the candidate listed in field two of the instruction must pass the following tests:

First, the candidate must be listed in the Parameter Command Table. If the candidate is not, an error message is issued to the CRT and the instruction is deleted from the progam.

Second, the candidate must not reference a switch, sync, or memory. This is determined by examining the parameter signature that is attached to the main parametric definition for the candidate.

Finally, the selected register must have its output select bit set. Remember that the function of an "ASSIGN" statement is to preset a panel register to some specified value. Thus, the register specified with the "ASSIGN" command must have an output select code.

If the candidate does not meet these criteria, an appropriate error message describing the failure is output to the display, and the instruction is deleted from the program.

(4) In the last field scanned by the "PRGCMO" module, a hexadecimal data value is expected. The data candidate retrieved from the instruction is first examined for its value content. If any character listed in the field is not a valid hexadecimal, an error message is output to the terminal.

If, instead, the value content is correct, the "PRGCMO" module then verifies that the data candidate is not larger in bit length than the register to which it is destined. If the data is larger in bit width than the register, an appropriate error message is issued, and the instruction is deleted from the program.

(5) When the instruction is deemed acceptable by the maintenance port, it is downloaded into its proper slot in the program instruction area. Note that at this time, the instruction exists only as an ASCII string and not as executable code.

(6) Each program mode instruction has associated with it a 43 byte micro written in assembly language code. These macros are referenced from root memory. The "ASSIGN" macro, depicted in FIG. 27, contains two "slots"—one for a register output select, and one for a data value.

After the "ASSIGN" instruction is downloaded (in ASCII format) to maintenance port ram, the "ASSIGN" macro is copied from root memory into the macro-instruction area of ram. The "PRGCMO" module then fetches the output select code listed in bytes 7 and 8 of the register's parametric definition and sends the code to the output select slot of the macro. The module also fetches the data value that was entered with the instruction and copies it into the macro's data value slot.

(7) After these activities have been performed, a new command line number is issued to the CRT. The operator may now either elect to type another instruction or to execute the existing program.

Executing a Program

When a "RUN" command is issued by the operator, the "PRGCM6" program mode module is placed into execution. The first activity performed by the "PRGCM6" module is to initialize the macro instruction vector "ICODE" to point to the macro corresponding to program line 00. (All programs begin execution at line 00.) In addition, the PRGCM6 routine downloads a macro that contains a "JUMP" assembly language instruction to root memory. This instruction provides the necessary link to between the program, as it is executing, and the termination or "clean-up" routines in root memory.

Once these activities are performed, the program is placed into execution at the macro address corresponding to the first program line. Program execution continues uninterrupted until one of the following actions are detected:

When a CTRL-S directive is keyed, the program is placed into a paused state. The CTRL-S directive is detected by all "JUMP", "LOOPCNTA" and "LOOPCNTB" macros.

When a CTRL-C directive is keyed, macro instruction execution is terminated, and the maintenance port is placed into its parameter mode. The CTRL-C directive is detected by all "JUMP", "LOOPCNTA" and "LOOPCNTB" macros.

When a CTRL-A directive is issued, macro instruction execution is terminated, and a new program mode prompt "/" is displayed. The CTRL-A directive is detected by all "JUMP", "LOOPCNTA", and "LOOPCNTB" macros.

When the termination vector downloaded by the "RUN" command is encountered, macro instruction execution is terminated, and a new program mode prompt "/" is displayed.

Finally, when a macro instruction higher than address 16 is referenced during the course of executing the program, an address out-of-range error is issued to the CRT terminal 12.

It is understood that certain modifications to the invention as described may be made, as might occur to one with skill in the field of the invention, within the scope of the appended claims. For other the Maintenance Port system could be designed with a microprocessor other than the 8085, such as an 8086, 6902, etc. Therefore, all embodiments contemplated hereunder which achieve the objects of the present invention have not been shown in complete detail. Other embodiments may be developed without departing from the scope of the appended claims.

What is claimed is:

1. A maintenance port system for use with a test system having a test computer, system test bus means, and test sets having automatic panels associated with digital apparatus to be tested, the system test bus means being normally coupled between the test computer and a plurality of panels;

said maintenance port system comprising a software development package and a maintenance unit having port means for input/output coupling to a terminal, and interface means for coupling via a test bus to one panel to be tested, the test bus being the same as the system test bus means but not coupled to the test computer, said terminal having display means and a keyboard;

said maintenance unit further comprising a microprocessor, a root memory comprising read-only memory means, a user memory comprising programmable read-only memory means, a ram memory comprising random-access memory means, socket means for the user memory, an internal bus coupled between the microprocessor and each of said memories, and address means including decode means and a multiconductor address line coupled between the microprocessor, each of said memories, said port means, and said interface means;

said root memory having stored therein software comprising terminal communications routines, command interpretation and execution routines, standard parameter format routines, parameter input/output drivers, error information, help and list commands, and parameter select and modification routines;

wherein said software development package contains programs that allow a user to generate user microcode from panel parameter information, the package being tailored to the root memory software, so that all addressing and formatting of panel parameters is resolved and the microcode generated is transparent to the user, such that when the user inputs parameter name, signature and desired text to the package, the resulting output is an object code file that when entered onto a blank programmable read-only memory device creates said user memory, which is then inserted into said socket means;

wherein said user memory contains parameter commands and signatures necessary to control the automatic panel, so that the user memory inserted into the socket means configures the maintenance port specifically for the automatic panel for which it was designed, the user memory having stored therein a unique command table containing parameter names, unique text for describing panel parameters, small command modules that call proper root memory formats for selected parameter, and parameter signatures used by root memory software; and which permits a user to call up and modify panel parameters via said terminal.

2. A maintenance port system according to claim 1, wherein said test bus comprises a plurality lines for a plurality of data bits and a plurality of commands, and said interface means comprises line drivers and line receivers coupling the lines for the data bits to buffer registers which are coupled to the internal bus, means for controlling the buffer registers and line drivers responsive to commands from the microprocessor via the decode means, additional line drivers coupled to said lines for commands, and means coupling the decode means to the additional line drivers to supply selected commands for control of the test bus.

3. A maintenance port system according to claim 2, wherein said microprocessor is a type 8085A.

4. A maintenance port system according to claim 3, wherein said port comprises an 8253 programmable timer and an 8251A programmable communications interface or usart, the timer having means for establishing a frequency that is equal to the baud rate of the terminal connected to the port, which frequency establishes the rate at which characters are transmitted or received by the usart, the port having a set of addresses for the timer and a set of addresses for the usart.

* * * * *